United States Patent
Sawafta et al.

(10) Patent No.: US 11,945,991 B2
(45) Date of Patent: *Apr. 2, 2024

(54) COMPOSITIONS COMPRISING PHASE CHANGE MATERIALS AND METHODS OF MAKING THE SAME

(71) Applicant: Phase Change Energy Solutions, Inc., Greensboro, NC (US)

(72) Inventors: Reyad I. Sawafta, Greensboro, NC (US); Najih Naser, Cary, NC (US)

(73) Assignee: PHASE CHANGE ENERGY SOLUTIONS, INC., Greensboro, NC (US)

(*) Notice: Subject to any disclaimer, the term of this patent is extended or adjusted under 35 U.S.C. 154(b) by 0 days.

This patent is subject to a terminal disclaimer.

(21) Appl. No.: 18/181,210

(22) Filed: Mar. 9, 2023

(65) Prior Publication Data
US 2023/0227704 A1    Jul. 20, 2023

Related U.S. Application Data

(63) Continuation of application No. 16/985,947, filed on Aug. 5, 2020, now Pat. No. 11,634,619, which is a continuation of application No. 15/867,405, filed on Jan. 10, 2018, now Pat. No. 10,745,604, which is a continuation of application No. 14/370,300, filed as application No. PCT/US2012/071988 on Dec. 28, 2012, now Pat. No. 9,914,865.

(60) Provisional application No. 61/582,549, filed on Jan. 3, 2012, provisional application No. 61/582,542, filed on Jan. 3, 2012.

(51) Int. Cl.
*C09K 5/06*     (2006.01)
*C08J 9/00*     (2006.01)

(52) U.S. Cl.
CPC ............ *C09K 5/063* (2013.01); *C08J 9/0009* (2013.01); *C08J 2375/04* (2013.01); *C09K 2205/102* (2013.01)

(58) Field of Classification Search
None
See application file for complete search history.

(56) References Cited

U.S. PATENT DOCUMENTS

| | | | |
|---|---|---|---|
| 5,565,132 A * | 10/1996 | Salyer | D01F 1/10 |
| | | | 165/53 |
| 6,183,855 B1 * | 2/2001 | Buckley | F28D 20/023 |
| | | | 165/104.23 |
| 7,687,548 B2 | 3/2010 | Bleys et al. | |
| 8,045,846 B2 * | 10/2011 | Amano | C09K 5/063 |
| | | | 392/339 |
| 8,236,866 B2 * | 8/2012 | Casati | C08G 18/4891 |
| | | | 521/173 |
| 8,349,452 B2 | 1/2013 | Jung et al. | |
| 8,957,122 B2 | 2/2015 | Altmann et al. | |
| 9,056,302 B2 | 6/2015 | Jung et al. | |
| 9,279,075 B2 | 3/2016 | Parker et al. | |
| 9,284,399 B2 | 3/2016 | Macken et al. | |
| 9,926,479 B2 | 3/2018 | Bleys et al. | |
| 11,634,619 B2 * | 4/2023 | Sawafta | C09K 5/063 |
| | | | 516/98 |
| 11,659,938 B2 | 5/2023 | Aou et al. | |
| 2005/0106392 A1 * | 5/2005 | Sano | A61F 7/03 |
| | | | 428/378 |
| 2007/0173154 A1 * | 7/2007 | Hartmann | D02G 3/404 |
| | | | 428/313.5 |
| 2009/0199994 A1 * | 8/2009 | Amano | F28D 20/023 |
| | | | 165/10 |
| 2012/0076843 A1 | 3/2012 | Jung et al. | |
| 2012/0149795 A1 | 6/2012 | Schleiermacher et al. | |
| 2012/0193572 A1 * | 8/2012 | MacKay | C09K 5/063 |
| | | | 252/79 |
| 2012/0238656 A1 | 9/2012 | De Kesel | |
| 2013/0004770 A1 | 1/2013 | Bleys et al. | |
| 2013/0298991 A1 | 11/2013 | Parker et al. | |
| 2019/0211171 A1 | 7/2019 | Aou et al. | |
| 2019/0248065 A1 | 8/2019 | Gorin et al. | |
| 2019/0322879 A1 | 10/2019 | Zhang | |
| 2020/0354536 A1 * | 11/2020 | Peterson | C08J 9/405 |
| 2020/0362216 A1 * | 11/2020 | Sawafta | C08J 9/0009 |
| 2021/0371577 A1 | 12/2021 | Meng et al. | |
| 2022/0010185 A1 | 1/2022 | Katano | |
| 2023/0109168 A1 | 4/2023 | Ahmadloo et al. | |
| 2023/0227613 A1 * | 7/2023 | Park | A61L 26/0066 |
| | | | 523/107 |
| 2023/0227704 A1 * | 7/2023 | Sawafta | C08J 9/0009 |
| | | | 516/98 |

* cited by examiner

*Primary Examiner* — Peter A Salamon
(74) *Attorney, Agent, or Firm* — Maynard Nexsen PC; John P. Zimmer

(57) ABSTRACT

In one aspect, compositions are described herein. In some embodiments, a composition comprises a phase change material, a hydrophobic sorption material, and a viscosity modifier. In some embodiments, a composition comprises a foam and a latent heat storage material dispersed in the foam, the latent heat storage material comprising a phase change material and a hydrophobic sorption material.

27 Claims, No Drawings

COMPOSITIONS COMPRISING PHASE CHANGE MATERIALS AND METHODS OF MAKING THE SAME

RELATED APPLICATION DATA

The present application is a continuation of U.S. patent application Ser. No. 16/985,947, filed Aug. 5, 2020, which is a continuation of U.S. patent application Ser. No. 15/867, 405, filed Jan. 10, 2018, which is a continuation application of U.S. patent application Ser. No. 14/370,300, filed Jul. 2, 2014, which is the national stage application under 35 U.S.C. § 371 of International Application No. PCT/US2012/071988, filed Dec. 28, 2012, which claims priority pursuant to 35 U.S.C. § 119(e) to U.S. Provisional Patent Application 61/582,549, filed on Jan. 3, 2012, and to U.S. Provisional Patent Application 61/582,542, filed on Jan. 3, 2012, each of which is hereby incorporated by reference in its entirety.

FIELD

The present invention relates to compositions comprising thermally active materials and methods of making the same.

BACKGROUND

In recent years latent heat storage has become increasingly important in a wide array of technologies. Latent heat includes thermal energy released or absorbed during a change of state of a material without a substantial change in the temperature of the material. The change of state can include a phase change such as a solid-liquid, solid-gas, liquid-gas, or solid-solid phase change, including a crystalline solid to amorphous solid phase change.

Due to their latent heat storage properties, phase change materials (PCMs) have found application in a wide array of thermal energy technologies. However, the use of PCMs has been somewhat limited by disadvantages associated with the phase changes exhibited by some PCMs, including large volume changes, slow transitions, and/or flow in a liquid state.

SUMMARY

In one aspect, compositions comprising a phase change material (PCM) are described herein. In some embodiments, a composition comprises as PCM, a hydrophobic sorption material, and a viscosity modifier. In some embodiments, the viscosity modifier comprises a diisocyanate or ionic liquid. In some embodiments, the PCM is at least partially adsorbed or absorbed by the hydrophobic, sorption material. Further, in some embodiments, the hydrophobic sorption material partially encapsulates the PCM.

A composition described herein, in some embodiments, further comprises a linker component having a chemical functional group capable of forming a chemical bond with a phase change material of the composition. Moreover, in some embodiments, a composition described herein comprises a gel.

A composition described herein, in some embodiments, further comprises one or more additives. For example, in some embodiments, an additive comprises a thermal conductivity modulator. In some embodiments, a composition comprises a plurality of additives.

In addition, in some embodiments, a composition described herein has a latent heat of at least about 100 J/g. The latent heat is associated with a transition between two condensed phases or states of the composition, such as a transition between a solid phase and a liquid phase, between a solid phase and a mesophase, or between two solid states. In other embodiments, a composition described herein is non-flammable or substantially non-flammable. In some embodiments, a composition described herein has a viscosity between about 200 centipoise (cP) and about 50,000 cP at a temperature between about −50° C. and about 100° C. and a pressure of about 1 atm.

In another aspect, methods of making a composition comprising a PCM are described herein. In some embodiments, a method of making a composition comprises providing a phase change material, providing a hydrophobic sorption material, providing a viscosity modifier, and combining the phase change material, hydrophobic sorption material, and viscosity modifier. In some embodiments, a method further comprises providing a linker component having a chemical functional group capable of forming a chemical bond with the phase change material and combining the linker component with the phase change material, hydrophobic sorption material, and viscosity modifier. In addition, in some embodiments, a method described herein further comprises forming a gel.

In another aspect, methods of making a foam are described herein. In some embodiments, a method of making a foam comprises combining a phase change material with a hydrophobic sorption material to provide a first mixture, combining a polyfunctional monomer with a linker component to provide a second mixture, and combining the first mixture with the second mixture. In some embodiments, the polyfunctional monomer comprises a polyol. In some embodiments, the linker component comprises an isocyanate. Further, in some embodiments, combining a PCM with a hydrophobic sorption material comprises saturating the hydrophobic sorption material with the PCM. Moreover, in some embodiments, combining a PCM with a hydrophobic sorption material comprises forming a gel.

In addition, in some embodiments, a method described herein further comprises providing a second linker component. In some embodiments, the second linker component is added to the first mixture prior to combining the first mixture with the second mixture. In some embodiments, adding a second linker component to the first mixture comprises forming a chemical bond between the second linker component and the PCM of the first mixture. Further, in some embodiments of methods described herein, combining a first mixture with a second mixture comprises cross-linking one or more components of the first mixture with one or more components of the second mixture.

Methods described herein, in some embodiments, further comprise providing a catalyst. In some embodiments, a catalyst is added to the first mixture. In some embodiments, a catalyst is added to the second mixture. In some embodiments, a catalyst is added to the combination of the first and second mixtures.

In addition, in some embodiments, a method described herein further comprises providing a blowing agent. A blowing agent, in some embodiments, is added to the combination of the first and second mixtures.

Further, in some embodiments, a method described herein further comprises providing an aqueous polymeric material. An aqueous polymeric material, in some embodiments, is added to the combination of the first and second mixtures.

Moreover, in some embodiments, a method described herein further comprises providing one or more additives. One or more additives, in some embodiments, are added to the first mixture. In some embodiments, one or more additives are added to the second mixture. In some embodiments, one or more additives are added to the combination of the first and second mixtures.

In some embodiments, a method of making a foam described herein comprises combining a PCM with a hydrophobic sorption material to provide a mixture, adding a polyfunctional monomer to the mixture, and adding a linker component to the mixture. In some embodiments, a method further comprises adding a second linker component to the mixture.

In another aspect, compositions comprising a foam are described herein. In some embodiments, a composition comprises a foam and a latent heat storage material dispersed in the foam, the latent heat storage material comprising a PCM and a hydrophobic sorption material. In some embodiments, the hydrophobic sorption material is saturated by the PCM. Moreover, in some embodiments, the hydrophobic sorption material does not comprise a microcapsule, such as a microcapsule encapsulating the PCM. Further, in some embodiments, the PCM is chemically bonded to a linker component of the latent heat storage material. In some embodiments, the latent heat storage material comprises a gel.

In addition, in some embodiments, a composition described herein further comprises an additive dispersed in the latent heat storage material. Further, in some embodiments, the latent heat storage material is free or substantially free of water.

These and other embodiments are described in greater detail in the description which follows.

DETAILED DESCRIPTION

Embodiments described herein can be understood more readily by reference to the following detailed description and examples. Elements, apparatus, and methods described herein, however, are not limited to the specific embodiments presented in the detailed description and examples. It should be recognized that these embodiments are merely illustrative of the principles of the present invention. Numerous modifications and adaptations will be readily apparent to those of skill in the art without departing from the spirit and scope of the invention.

In addition, all ranges disclosed herein are to be understood to encompass any and all subranges subsumed therein. For example, a stated range of "1.0 to 10.0" should be considered to include any and all subranges beginning with a minimum value of 1.0 or more and ending with a maximum value of 10.0 or less, e.g., 1.0 to 5.3, or 4.7 to 10.0, or 3.6 to 7.9.

I. Compositions Comprising a Phase Change Material

In one aspect, compositions comprising a phase change material are described herein. In some embodiments, a composition comprises a phase change material (PCM), a hydrophobic sorption material, and a viscosity modifier. In some embodiments, the hydrophobic sorption material and the viscosity modifier do not comprise the same material. Further, in some embodiments, a composition comprises a plurality of differing PCMs, a plurality of differing hydrophobic sorption materials, and/or a plurality of differing viscosity modifiers.

Moreover, in some embodiments of compositions described herein, a PCM comprises an absorbate. For example, in some embodiments, a PCM is at least partially absorbed by a hydrophobic sorption material described herein. Further, in some embodiments, a hydrophobic sorption material comprises an absorbent. In other embodiments, a PCM is at least partially adsorbed by a hydrophobic sorption material. In some embodiments, for instance, a PCM comprises an adsorbate of the hydrophobic sorption material. Moreover, in some embodiments, a hydrophobic sorption material adsorbs or absorbs a hydrophobic portion of a PCM, such as an aliphatic hydrocarbon portion of a PCM.

In addition, in some embodiments, a hydrophobic sorption material described herein partially encapsulates a PCM. In some embodiments, a composition described herein comprises a self-encapsulating PCM. In some embodiments, a composition described herein is not encapsulated by a microcapsule, such as a polymer microcapsule.

In some embodiments, a composition described herein further comprises a linker component. The linker component has a chemical functional group capable of forming a chemical bond with a PCM of the composition. Further, in some embodiments, a composition comprises a linker component chemically bonded to a PCM. In some embodiments, a composition comprises a plurality of differing linker components.

Moreover, in some embodiments, a composition described herein comprises a gel. A gel, in some embodiments, comprises a continuous phase formed from PCM of the composition. In other embodiments, a gel comprises a discontinuous phase firmed from a PCM. A phase comprising a PCM, in some embodiments, can be a liquid phase or a solid phase. In addition, in some embodiments, a gel comprises a solid phase formed from a hydrophobic sorption material of the composition. The solid phase, in some embodiments, is a continuous phase. Further, in some embodiments, a gel does not comprise water or is substantially free of water. For reference purposes herein, a substance that is substantially free of water comprises less than about 10 weight percent, less than about 5 weight percent, less than about 1 weight percent, or less than about 0.1 weight percent water, based on the total weight of the substance.

In addition, in some embodiments, a composition described herein comprises one or more additives. In some embodiments, an additive provides one or more properties to a composition described herein. For instance, in some embodiments, an additive comprises a thermal conductivity modulator. A thermal conductivity modulator, in some embodiments, is operable to alter or modulate the thermal conductivity of a composition described herein. In some embodiments, an additive comprises an antimicrobial material and/or a fire retardant. Moreover, in some embodiments, an additive does not comprise water. In some embodiments, a composition described herein is free or substantially free of water.

Turning now to specific components of compositions, compositions described herein comprise one or more phase change materials (PCMs). Any PCM not inconsistent with the objectives of the present invention may be used. In some embodiments, for instance, a PCM comprises a fatty acid. A fatty acid, in some embodiments, can have a C4 to C28 aliphatic hydrocarbon tail. Further, in some embodiments, the hydrocarbon tail is saturated. Alternatively, in other embodiments, the hydrocarbon tail is unsaturated. In some embodiments, the hydrocarbon tail can be branched or linear. Non-limiting examples of fatty acids suitable for use in some embodiments described herein include caprylic acid, capric acid, lauric acid, myristic acid, palmitic acid, stearic acid, arachidic acid, behenic acid, lignoceric acid, and cerotic acid. In some embodiments, PCM described herein comprises a plurality of differing fatty acids.

In some embodiments, a PCM comprises an alkyl ester of a fatty acid. Any alkyl ester not inconsistent with the objectives of the present invention may be used. For instance, in some embodiments, an alkyl ester comprises a methyl, ethyl, propyl, or butyl ester of a fatty acid described herein. In other embodiments, an alkyl ester comprises a C2 to C6 ester alkyl backbone or a C6 to C12 ester alkyl backbone. In some embodiments, an alkyl ester comprises a C12 to C28 ester alkyl backbone. Further, in some embodiments, an oxidized fatty component described herein comprises a plurality of differing alkyl esters of fatty acids. Non-limiting examples of alkyl esters of fatty acids suitable for use in some embodiments described herein include methyl laurate, methyl myristate, methyl palmitate, methyl stearate, methyl palmitoleate, methyl oleate, methyl linoleate, methyl docosahexanoate, and methyl ecosapenanoate. In some embodiments, the corresponding ethyl, propyl, or butyl esters may also be used.

In some embodiments, a PCM comprises a fatty alcohol. Any fatty alcohol not inconsistent with the objectives of the present invention may be used. For instance, a fatty alcohol, in some embodiments, can have a C4 to C28 aliphatic hydrocarbon tail. Further, in some embodiments, the hydrocarbon tail is saturated. Alternatively, in other embodiments, the hydrocarbon tail is unsaturated. In some embodiments, the hydrocarbon tail can be branched or linear. Non-limiting examples of fatty alcohols suitable for use in some embodiments described herein include capryl alcohol, pelargonic alcohol, capric alcohol, undecyl alcohol, lauryl alcohol, tridecyl alcohol, myristyl alcohol, pentadecyl alcohol, cetyl alcohol, heptadecyl alcohol, stearyl alcohol, nonadecyl alcohol, arachidyl alcohol, heneicosyl alcohol, behenyl alcohol, lignoceryl alcohol, ceryl alcohol, and montanyl alcohol. In some embodiments, a PCM comprises a plurality of differing fatty alcohols.

In some embodiments, a PCM comprises a fatty sulfonate or phosphonate. Any fatty sulfonate or phosphonate not inconsistent with the objectives of the present invention may be used. In some ernbodiments, a PCM comprises a C4 to C28 alkyl sulfonate or phosphonate. In some embodiments, a PCM comprises a C4 to C28 alkenyl sulfonate or phosphonate. Further, in some embodiments, a PCM comprises a polyethylene glycol. Any polyethylene glycol not inconsistent with the objectives of the present invention may be used.

In some embodiments, a composition described herein comprises a plurality of differing PCMs. Any combination of differing PCMs not inconsistent with the objectives of the present invention may be used. In some embodiments, for example, a composition comprises one or more fatty acids and one or more fatty alcohols. Moreover, in some embodiments of compositions comprising a plurality of PCMs, the plurality of PCMs comprises between about 1 and about 99 weight percent fatty acid based on the total weight of the plurality of PCMs. In some embodiments, the plurality comprises between about 10 and about 90 weight percent, between about 20 and about 80 weight percent, between about 30 and about 70 weight percent, or between about 50 and about 90 weight percent fatty acid. In some embodiments, a plurality of PCMs comprises between about 1 and about 99 weight percent alkyl ester of a fatty acid. In some embodiments, the plurality comprises between about 10 and about 90 weight percent, between about 20 and about 80 weight percent, between about 30 and about 70 weight percent, or between about 50 and about 90 weight percent alkyl ester of a fatty acid. Further, in some embodiments, a plurality of PCMs comprises between about 1 and about 99 weight percent fatty alcohol. In some embodiments, the plurality comprises between about 10 and about 90 weight percent, between about 20 and about 80 weight percent, between about 30 and about 70 weight percent, between about 5 and about 50 weight percent, or between about 5 and about 25 weight percent fatty alcohol.

Further, in some embodiments, a plurality of differing PCMs is selected based on a desired viscosity and/or latent heat of the composition. In some embodiments, a plurality of differing PCMs is selected based on a desired phase transition temperature of a composition. A phase transition temperature, in some embodiments, is between about −50° C. and about 100° C. at 1 atm or between about −40° C. and about 40° C. at 1 atm. In some embodiments, a phase transition temperature is between about −50° C. and about 0° C. at 1 atm or between about −20° C. and about 0° C. at 1 atm. In some embodiments, a phase transition temperature is between about 0° C. and about 70° C. at 1 atm or between about −4° C. and about 40° C. at 1 atm. In other embodiments, a phase transition temperature is between about 30° C. and about 50° C. at 1 atm or between about 35° C. and about 45° C. at 1 atm.

In addition, a PCM or a plurality of PCMs described herein can be present in a composition in any amount not inconsistent with the objectives of the present invention. In some embodiments, for example, a composition comprises between about 50 and about 99 weight percent PCM based on the total weight of the composition. In some embodiments, a composition comprises between about 70 and about 90 weight percent, between about 75 and about 85 weight percent, between about 85 and about 95 weight percent, or between about 90 and about 99 weight percent PCM.

Compositions described herein also comprise one or more hydrophobic sorption materials. Any hydrophobic sorption material not inconsistent with the objectives of the present invention may be used. In some embodiments, for instance, a hydrophobic sorption material comprises an aerogel. An aerogel, in some embodiments, comprises an organic composition, such as agar. In some embodiments, an aerogel comprises carbon. In some embodiments, an aerogel comprises alumina. In some embodiments, an aerogel comprises silica, including fumed silica. Moreover, an aerogel comprising fumed silica, in some embodiments, comprises particles having a size from about 1 μm to about 10 mm. In some embodiments, the particles have a size from about 1 μm to about 100 μm, from about 1 μm to about 10 μm, or from about 5 μm to about 10 μm. Further, in some embodiments, an aerogel has high porosity. For instance, in some embodiments, an aerogel comprises over 90 percent air. In addition, in some embodiments, an aerogel comprises pores having a size between about 1 nm and about 100 nm. In some embodiments, the pores have a size between about 10 nm and about 100 nm or between about 20 nm and about 40 nm. Moreover, an aerogel described herein, in some embodiments, has a high surface area, such as a surface area of about 500 m²/g or more. In some embodiments, an aerogel has a surface area between about 500 m²/g and about 1000 m²/g, or between about 600 m²/g and about 900 m²/g. In addition, in some embodiments, an aerogel has a low tap density. In some embodiments, for instance, an aerogel has a tap density less than about 500 kg/m³ or less than about 100 kg/m³. In some embodiments, an aerogel has a tap density between about 1 kg/m³ and about 200 kg/m³, between about 10 kg/m³ and about 100 kg/m³. Further, in some embodiments, an aerogel described herein has a low thermal conductivity. In some embodiments, an aerogel has a thermal conductivity less than about 50 mW/mK or less than about 20 mW/mK. In some embodiments, an aerogel has a thermal conductivity between about 1 mW/mK and about 20 mW/mK or between about 5 mW/mK and about 15 mW/mK. Moreover, in some embodiments, an aerogel has a hydrophobic surface. In addition, in some embodiments, an aerogel has a high oil absorption capacity (DBP). In some embodiments, an aerogel has an oil absorption capacity greater than about 100 g/100 g. In some embodiments, an aerogel has an oil absorption capacity greater than about 500 g/100 g. In some embodiments, an aerogel has an oil absorption capacity between about 100 g/100 g and about 1000 g/100 g, between about 300 g/100 g and about 800 g/100 g, or between about 400 g/100 g and about 600 g/100 g. Further, in some embodiments, an aerogel has a specific heat capacity between about 0.1 kJ/(kg K) and about 5 kJ/(kg K). In some embodiments, an aerogel has a specific heat capacity between about 0.5 kJ/(kg K) and about 1.5 kJ/(kg K).

In other embodiments, a hydrophobic sorption material comprises a polymeric material. Any polymeric material not inconsistent with the objectives of the present invention may be used. In some embodiments, a polymeric material comprises an organic composition. For example, in some embodiments, a polymeric material comprises a polyolefin such as polyethylene or polypropylene, a polycarbonate, a polyester, or a polyurethane. In some embodiments, a polymeric material comprises polyvinyl alcohol (PVA). In some embodiments, a polymeric material comprises acrylonitrile, including a polyacrylonitrile or acrylonitrile copolymer. An acrylonitrile copolymer, in some embodiments, comprises styrene-acrylonitrile (SAN), acrylonitrile styrene acrylate (ASA), acrylonitrile butadiene (NBR), acrylonitrile butadiene styrene (ABS). In some embodiments, a composition comprises a particulate polymeric material, such as ABS grains.

In some embodiments, a polymeric material comprises a styrene block copolymer (SBC). A styrene block copolymer, in some embodiments, comprises a linear triblock copolymer. The linear triblock copolymer, in some embodiments, comprises an A-B-A structure, where the A blocks comprise polystyrene and the B block comprises an elastomer. In some embodiments, an SBC comprises between about 20 percent and about 40 percent polystyrene. In some embodiments, an SBC comprises between about 25 percent and about 35 percent polystyrene. Further, in some embodiments, a SBC can be maleated or unmaleated. Moreover, in some embodiments, an SBC has an average molecular weight greater than about 75,000. In some embodiments, an SBC has an average molecular weight greater than about 200,000. In some embodiments, an SBC has an average molecular weight between about 75,000 and about 1,000,000, between about 75,000 and about 500,000, or between about 100,000 and about 300,000. For reference purposes herein, molecular weight comprises weight average molecular weight. In addition, in some embodiments, an SBC has a specific gravity less than about 1. In some embodiments, an SBC has a Shore A hardness between about 50 and about 100. In some embodiments, an SBC has a Shore A hardness between about 50 and about 75 or between about 55 and about 70. Non-limiting examples of SBCs useful in some embodiments described herein include styrene-ethylene-butylene-styrene, styrene-ethylene-propylene-styrene, styrene-ethylene-ethylene/propylene-styrene, styrene-isobutylene-styrene, styrene-butadiene-styrene, styrene-isoprene-styrene, and combinations thereof. Commercially available SBCs useful in some embodiments described herein include SBCs provided by Kraton Polymers (Houston, Tex.), such as Kraton G1651HU, Kraton G1650, Kraton G1652, and Kraton G1654H.

In some embodiments, a polymeric material comprises a biopolymer. For instance, in some embodiments, a polymeric material comprises cellulose or a cellulosic material or cellulose derivative. In some embodiments, a polymeric material comprises hydroxymethyl cellulose (HMC), hydroxyethyl cellulose (HEC), hydroxypropyl cellulose (HPC), hydroxypropylmethyl cellulose (HPMC), hydroxypropyl methylcellulose phthalic ester (HPMCP), methyl cellulose (MC), ethyl cellulose (EC), carboxymethylcellulose (CMC), and/or polyanionic cellulose (PAC). In some embodiments, a cellulosic material or cellulose derivative has a molecular weight between about 100,000 and about 2,000,000. In some embodiments, a cellulosic material or cellulosic derivative has a molecular weight between about 250,000 and about 1,500,000, between about 250,000 and about 450,000, between about 750,000 and about 950,000, or between about 1,000,000 and about 1,300,000. Further, in some embodiments, a polymeric material comprises chitosan. In some embodiments, the chitosan has a molecular weight between about 3000 and 20,000. Further, in some embodiments, the chitosan has a degree of deacetylation between about 50 percent and about 100 percent.

In some embodiments, a hydrophobic sorption material comprises an inorganic composition. For example, in some embodiments, a hydrophobic sorption material comprises a zeolite. Any zeolite not inconsistent with the objectives of the present invention may be used. In some embodiments, a zeolite comprises a natural zeolite. In other embodiments, a zeolite comprises an artificial zeolite. In some embodiments, a zeolite comprises a silicate and/or aluminosilicate. In some embodiments, a zeolite comprises a composition according to the formula $M_{x/n}[(AlO_2)_x(SiO_2)_y] \cdot w\, H_2O$, where n is the valence of cation M (e.g., $Na^+$, $K^+$, $Ca^{2+}$, or $Mg^{2+}$), w is the number of water molecules per unit cell, and x and y are the total number of tetrahedral atoms per unit cell. Non-limiting examples of zeolites suitable for use in some embodiments described herein include analcime ((K,Ca,Na)$AlSi_2O_6 \cdot H_2O$), chabazite ((Ca,Na$_2$,K$_2$,Mg)$Al_2Si_4O_{12} \cdot 6H_2O$), clinoptilolite ((Na,K,Ca)$_{2-3}Al_3$(Al,Si)$_2Si_{13}O_{36} \cdot 12H_2O$), heulandite ((Ca,Na)$_{2-3}Al_3$(Al,Si)$_2Si_{13}O_{36} \cdot 12H_2O$), natrolite (Na$_2Al_2Si_3O_{10} \cdot 2H_2O$), phillipsite ((Ca,Na$_2$,K$_2$)$_3Al_6Si_{10}O_{32} \cdot 12H_2O$), and stilbite (NaCa$_4$(Si$_{27}Al_9$)O$_{72} \cdot 28(H_2O)$).

Further, in some embodiments, a composition described herein comprises a plurality of differing hydrophobic sorption materials. Any combination of differing hydrophobic sorption materials not inconsistent with the objectives of the present invention may be used. For instance, in some embodiments, a composition comprises an aerogel and a polymeric material. In some embodiments, a composition comprises one or more aerogels, one or more polymeric materials, and/or one or more zeolites. Further, in some embodiments, a plurality of differing hydrophobic sorption materials of a composition is selected based on a desired viscosity of the composition.

In addition, a hydrophobic sorption material described herein can be present in a composition in any amount not inconsistent with the objectives of the present invention. In some embodiments, for instance, a composition described herein comprises less than about 20 weight percent hydrophobic sorption material based on the total weight of the composition. In some embodiments, a composition comprises less than about 10 weight percent, less than about 5 weight percent, less than about 3 weight percent, less than about 2 weight percent, or less than about 1 weight percent hydrophobic sorption material. In some embodiments, a composition comprises between about 1 weight percent and about 20 weight percent, between about 1 weight percent and about 10 weight percent, between about 1 weight percent and about 5 weight percent, or between about 5 weight percent and about 10 weight percent hydrophobic sorption material.

Compositions described herein also comprise one or more viscosity modifiers. Any viscosity modifier not inconsistent with the objectives of the present invention may be used. In some embodiments, a viscosity modifier comprises an ionic liquid. Any ionic liquid not inconsistent with the objectives of the present invention may be used. In some embodiments, for instance, an ionic liquid is imidazolium-based. In other embodiments, an ionic liquid is pyridinium-based. In some embodiments, an ionic liquid is choline-based. Further, in some embodiments, an ionic liquid comprises a sugar, sugar alcohol, or sugar derivative, such as glycol-choline, glycerol-choline, erythritol-choline, threitol-choline, arabitol-choline, xylitol-choline, ribitol-choline, mannitol-choline, sorbitol-choline, dulcitol-choline, iditol-choline, isomalt-choline, maltitol-choline, or lactitol-choline. Non-limiting examples of ionic liquids suitable for use in some embodiments described herein include 1-Allyl-3-methylimidazolium bis(trifluoromethylsulfonyl)imide, 1-Allyl-3-methylimidazolium bromide, 1-Allyl-3-methylimidazolium dicyanamide, 1-Allyl-3-methylimidazolium iodide, 1-Benzyl-3-methylimidazolium chloride, 1-Benzyl-3-methylimidazolium hexafluorophosphate, 1-Benzyl-3-methylimidazolium tetrafluoroborate, 1,3-Bis(3-cyanopropyl)imidazolium bis(trifluoromethylsulfonyl)imide, 1,3-Bis(3-cyanopropyl)imidazolium chloride, 1-Butyl-2,3-dimethylimidazolium hexafluorophosphate, 1-Butyl-2,3-dimethylimidazolium tetrafluoroborate, 4-(3-Butyl-1-imidazolio)-1-butanesulfonate, 1-Butyl-3-methylimidazolium acetate, 1-Butyl-3-methylimidazolium chloride, 1-Butyl-3-methylimidazolium dibutyl phosphate, 1-Butyl-3-methylimidazolium hexafluorophosphate, 1-Butyl-3-methylimidazolium nitrate, 1-Butyl-3-methylimidazolium octyl sulfate, 1-Butyl-3-methylimidazolium tetrachloroaluminate, 1-Butyl-3-methylimidazolium tetrafluoroborate, 1-Butyl-3-methylimidazolium thiocyanate, 1-Butyl-3-methylimidazolium tosylate, 1-Butyl-3-methylimidazolium trifluoroacetate, 1-Butyl-3-methylimidazolium trifluoromethanesulfonate, 1-(3-Cyanopropyl)-3-methylimidazolium bis(trifluoromethylsulfonyl)amide, 1-Decyl-3-methylimidazolium tetrafluoroborate, 1,3-Diethoxylmidazolium bis(trifluoromethylsulfonyl)imide, 1,3-Diethoxyimidazolium hexafluorophosphate, 1,3-Dihydroxyimidazolium bis(trifluoromethylsulfonyl)imide, 1,3-Dihydroxy-2-methylimidazolium bis(trifluoromethylsulfonyl)imide, 1,3-Dimethoxy-2-methylimidazolium hexafluorophosphate, 1-Dodecyl-3-methylimidazolium iodide, 1-Ethyl-2,3-dimethylimidazolium tetrafluoroborate, 1-Ethyl-3-methylimidazolium hexafluorophosphate, 1-Ethyl-3-methylimidazolium L-(+)-lactate, 1-Ethyl-3-methylimidazolium 1,1,2,2-tetrafluoroethanesulfonate, 1-Hexyl-3-methylimidazolium bis(trifluormethylsulfonyl)imide, 1-Hexyl-3-methylimidazolium chloride, 1-Hexyl-3-methylimidazolium hexafluorophosphate, 1-Methylimidazolium chloride, 1-Methyl-3-octylimidazolium chloride, 1-Methyl-3-octylimazidazolium tetrafluoroborate, 1-Methyl-3-propylimidazolium iodide, 1-Methyl-3-(3,3,4,4,5,5,6,6,7,7,8,8,8-tridecafluorooctyl)imidazolium hexafluorophosphate, 1,2,3-Trimethylimidazolium methyl sulfate, 1-Butyl-4-methylpyridinium chloride, 1-Butyl-4-methylpyridinium hexafluorophosphate, 1-Butylpyridinium bromide, 1-(3-Cyanopropyl)pyridinium chloride, 1-Ethylpyridinium tetrafluoroborate, 3-Methyl-1-propylpyridinium bis(trifluormethylsulfonyl)imide, and Cholin acetate, all available commercially from Sigma-Aldrich.

In other embodiments, a viscosity modifier comprises a diisocyanate. Any diisocyanate not inconsistent with the objectives of the present invention may be used. In some embodiments, a diisocyanate comprises a methylene diphenyl diisocyanate (MDI). In some embodiments, a diisocyanate comprises a toluene diisocyanate (TDI), naphthalene diisocyanate (NDI), isophorone diisocyanate (IPDI), and/or hexamethylene diisocyanate (HDI). Non-limiting examples of diisocyanates suitable for use in some embodiments described herein include Lupranate® LP27, LP30, LP30D, M, MI, MS, M10, M20, M20S, M20FB, M20HB, M20SB, M70L, MM103, MP102, MS, R2500, R2500U, T80-Type 1, T80-Type 2, TF2115, 78, 81, 219, 223, 227, 230, 234, 245, 259, 265, 266, 273, 275, 278, 280, 281, 5010, 5020, 5030, 5040, 5050, 5060, 5070, 5080, 5090, 5100, 5110, 5140, 5143, and 8020, all commercially available from BASF. Other non-limiting examples of diisocyanates suitable for use in some embodiments described herein include Suprasec® 2004, 2029, 5025, 7316, 7507, 9150, 9561, 9577, 9582, 9600, 9603, 9608, 9612, 9610, 9612, 9615, and 9616 as well as Rubinate® 1209, 1234, 1670, 1790, 1920, 9040, 9234, 9236, 9271, 9272, 9465, and 9511, all commercially available from Huntsman. Other major producers of diisocyanates include Bayer, BorsodChem, Dow, Mitsui, Nippon Polyurethane Industry and Yantai Wanhua.

Further, in some embodiments, a composition described herein comprises a plurality of differing viscosity modifiers. Any combination of differing viscosity modifiers not inconsistent with the objectives of the present invention may be used. In some embodiments, a plurality of differing viscosity modifiers is selected based on a desired consistency or viscosity of a composition described herein.

In addition, a viscosity modifier described herein can be present in a composition in any amount not inconsistent with the objectives of the present invention. In some embodiments, for instance, a composition described herein comprises less than about 10 weight percent viscosity modifier based on the total weight of the composition. In some embodiments, a composition comprises less than about 5 weight percent, less than about 3 weight percent, less than about 2 weight percent, or less than about 1 weight percent viscosity modifier. In some embodiments, a composition comprises between about 1 weight percent and about 5 weight percent or between about 1 weight percent and about 3 weight percent viscosity modifier.

A composition described herein, in some embodiments, further comprises one or more linker components. In some embodiments, a linker component is chemically bonded to a PCM of the composition. Further, in some embodiments, a linker component chemically bonded to a PCM provides a non-polymeric material. In some embodiments, a linker component chemically bonded to a PCM provides an oligomeric material. In some embodiments, for example, a PCM is monofunctional. A monofunctional PCM, in some embodiments, can be chemically bonded to a linker component through a single functional group, such as a carboxyl or hydroxyl group. Further, in some embodiments, a linker component is polyfunctional. A polyfunctional linker component, in some embodiments, can be chemically bonded to more than one PCM, including more than one monofunctional PCM. For example, in some embodiments, a bifunctional linker component (B) can be chemically bonded to two monofunctional PCMs (A) to provide an A-B-A trimer. In other embodiments, a bifunctional linker component is chemically bonded to one monofunctional PCM to provide an A-B dimer. Moreover, in some embodiments, a linker component described is also operative as a viscosity modifier described herein.

Further, a linker component can be chemically bonded to a PCM through any chemical bond not inconsistent with the objectives of the present invention. In some embodiments, for instance, a linker component is chemically bonded to a PCM through a covalent bond. In other embodiments, a linker component is chemically bonded to a PCM through an ionic bond or electrostatic bond. In some embodiments, a linker component is chemically bonded to a PCM through a hydrogen bond. In some embodiments, a linker component is chemically bonded to a PCM through a urethane bond. In other embodiments, a linker component is chemically bonded to a PCM through an amide bond. In some embodiments, a linker component is chemically bonded to a PCM through an ester bond.

In addition, a linker component described herein can comprise any chemical species not inconsistent with the objectives of the present invention. In some embodiments, for instance, a linker component comprises a functional group capable of forming a covalent bond with a functional group of a PCM described herein, such as a carboxyl group or a hydroxyl group. In some embodiments, a linker component comprises a polyol. In some embodiments, a linker component comprises a saccharide, including a monosaccharide, disaccharide, oligosaccharide, or polysaccharide. A polysaccharide, in some embodiments, comprises cellulose or a cellulose derivative. Further, in some embodiments, a linker component comprises a sugar alcohol, such as glycol, glycerol, erythritol, threitol, arabitol, xylitol, ribitol, mannitol, sorbitol, dulcitol, iditol, isomalt, maltitol, or lactitol.

In other embodiments, a linker component comprises an isocyanate. In some embodiments, a linker component comprises a diisocyanate, such as a methylene diphenyl diisocyanate (MDI), toluene diisocyanate (TDI), naphthalene diisocyanate (NDI), isophorone diisocyanate (IPDI), and/or hexamethylene diisocyanate (HDI). Non-limiting examples of diisocyanates suitable for use in some embodiments described herein include Lupranate® LP27, LP30, LP30D, M, MI, MS, M10, M20, M20FB, M20HB, M20SB, M70L, MM103, MP102, MS, R2500, R2500U, T80-Type 1, T80-Type 2, TF2115, 78, 81, 219, 223, 227, 230, 234, 245, 259, 265, 266. 273, 275, 278, 280, 281, 5010, 5020, 5030, 5040, 5050, 5060, 5070, 5080, 5090, 5100, 5110, 5140, 5143, and 8020, all commercially available from BASF. Other non-limiting examples of diisocyanates suitable for use in some embodiments described herein include Suprasec® 2004, 2029, 5025, 7316, 7507, 9150, 9561, 9577, 9582, 9600, 9603, 9608, 9612, 9610, 9612, 9615, and 9616 as well as Rubinate® 1209, 1234, 1670, 1790, 1920, 9040, 9234, 9236, 9271, 9272, 9465, and 9511, all commercially available from Huntsman. Other major producers of diisocyanates include Bayer, BorsodChem, Dow, Mitsui, Nippon Polyurethane Industry and Yantal Wanhua.

Further, in some embodiments, a composition described herein comprises a plurality of differing linker components. Any combination of differing linker components not inconsistent with the objectives of the present invention may be used. In some embodiments, a plurality of differing linker components is selected based on a desired viscosity of a composition.

In addition, a linker component described herein can be present in a composition in any amount not inconsistent with the objectives of the present invention. In some embodiments, for instance, a composition comprises less than about 10 weight percent linker component based on the total weight of the composition. In some embodiments, a composition comprises less than about 5 weight percent, less than about 3 weight percent, less than about 2 weight percent, or less than about 1 weight percent linker component. In some embodiments, a composition comprises between about 1 weight percent and about 5 weight percent linker component or between about 1 weight percent about 8 weight percent linker component. Further, in some embodiments, a composition comprises less linker component than PCM. For example, in some embodiments, the ratio of PCM to linker component is greater than about 2:1, greater than about 5:1, greater than about 10:1, greater than about 20:1, or greater than about 40:1 by weight. In some embodiments, the ratio of PCM to linker component is between about 2:1 and about 50:1 or between about 5:1 and about 30:1.

A composition described herein, in some embodiments further comprises one or more additives. Any additive not inconsistent with the objectives of the present invention may be used. In some embodiments, for instance, an additive comprises a thermal conductivity modulator. A thermal conductivity modulator, in some embodiments, comprises carbon, including graphitic carbon. In some embodiments, a thermal conductivity modulator comprises carbon black and/or carbon nanoparticles. Carbon nanoparticles, in some embodiments, comprise carbon nanotubes and/or fullerenes. In some embodiments, a thermal conductivity modulator comprises a graphitic matrix structure. In other embodiments, a thermal conductivity modulator comprises an ionic liquid. In some embodiments, a thermal conductivity modulator comprises a metal, including pure metals and alloys. Any metal not inconsistent with the objectives of the present invention may be used. In some embodiments, a metal comprises a transition metal, such as silver or copper. In some embodiments, a metal comprises an element from Group 13 or Group 14 of the periodic table. In some embodiments, a metal comprises aluminum. In some embodiments, a thermal conductivity modulator comprises a metallic filler, a metal matrix structure, a metal tube, a metal plate, and/or metal shavings. Further, in some embodiments, a thermal conductivity modulator comprises a metal oxide. Any metal oxide not inconsistent with the objectives of the present invention may be used. In some embodiments, a metal oxide comprises a transition metal oxide. In some embodiments, a metal oxide comprises alumina.

In some embodiments, an additive comprises an antimicrobial material. Any antimicrobial material not inconsistent with the objectives of the present invention may be used. An antimicrobial material, in some embodiments, comprises an inorganic composition, including metals and/or metal salts. In some embodiments, for example, an antimicrobial material comprises metallic copper, zinc, or silver or a salt of copper, zinc, or silver. Moreover, in some embodiments, an antimicrobial material comprising a metal can also provide thermal conductivity modulation. In other embodiments, an antimicrobial material comprises an organic composition, including natural and synthetic organic compositions. In some embodiments, an antimicrobial material comprises a β-lactam such as a penicillin or cephalosporin. In some embodiments, an antimicrobial material comprises a protein synthesis inhibitor such as neomycin. In some embodiments, an antimicrobial material comprises an organic acid, such as lactic acid, acetic acid, or citric acid. In some embodiments, an antimicrobial material comprises a quarternary ammonium species. A quarternary ammonium species, in some embodiments, comprises a long alkyl chain, such as an alkyl chain having a C8 to C28 backbone. In some embodiments, an antimicrobial material comprises one or more of benzalkonium chloride, benzethonium chloride, methylbenzethonium chloride, cetalkonium chloride, cetylpyridinium chloride, cetrimonium, cetrimide, dofanium chloride, tetraethylammonium bromide, didecyldimethylamnionium chloride, and domiphen bromide.

In some embodiments, an additive comprises a fire retardant. Any fire retardant not inconsistent with the objectives of the present invention may be used. In some embodiments, a fire retardant comprises a foam or gel. Further, in some embodiments, a fire retardant can comprise an organic composition or an inorganic composition. In some embodiments, a fire retardant comprises tris(2-chloro-1-(chloromethyl)ethyl)phosphate. In some embodiments, a fire retardant comprises aluminum hydroxide and/or magnesium hydroxide. In some embodiments, a fire retardant comprises a zeolite, including a zeolite described herein.

Moreover, a composition described herein can comprise any combination of PCMs, hydrophobic sorption materials, viscosity modifiers, linker components, and/or additives not inconsistent with the objectives of the present invention.

In addition, a composition described herein, in some embodiment, exhibits desirable latent heat storage properties. In some embodiments, for instance, a composition described herein has a latent heat of at least about 100 J/g. In some embodiments, a composition has a latent heat of at least about 150 J/g. In some embodiments, a composition has a latent heat of at least about 180 J/g. In some embodiments, a composition has a latent heat of at least about 200 J/g. In some embodiments, a composition has a latent heat of at least about 220 J/g, at least about 230 J/g, or at least about 250 J/g. In some embodiments, a composition has a latent heat between about 100 J/g and about 300 J/g. In some embodiments, a composition has a latent heat between about 150 J/g and about 250 J/g, between about 150 J/g and about 220 J/g, between about 150 J/g and about 200 J/g, between about 180 J/g and about 250 J/g, or between about 180 J/g and about 220 J/g. Further, the latent heat of a composition described herein is associated with a transition between two condensed phases or states of the composition, such as a transition between a solid phase and a liquid phase, between a solid phase and a mesophase, or between two solid states. A mesophase, in some embodiments, comprises a phase intermediate between a solid phase and a liquid phase. In addition, it is contemplated herein that, in some embodiments, a composition may have more than one latent heat associated with a transition between two condensed phases or states, such as a first latent heat associated with a crystalline solid-amorphous solid transition and a second latent heat associated with a solid-liquid transition. In some embodiments comprising a composition having more than one latent heat associated with a transition between two condensed phases, one of the latent heats has a value described hereinabove. In other embodiments, a plurality or all of the latent heats have a value described hereinabove.

Moreover, in some embodiments, a composition described herein has a latent heat substantially equal to or greater than a latent heat of a PCM of the composition. In some embodiments, a composition has a latent heat of at least about 80 percent of a latent heat of a PCM of the composition. In some embodiments, a composition has a latent heat of at least about 90 percent or at least about 95 percent of a latent heat of a PCM of the composition. In some embodiments, a composition has a latent heat greater than a latent heat of a PCM of the composition.

Further, in some embodiments, a composition described herein exhibits other desirable properties for latent heat storage applications. For example, in some embodiments, a composition is non-flammable or substantially non-flammable. For reference purposes herein, a non-flammable or substantially non-flammable composition has a rating of A1, A2, or B1 when measured according to DIN 4102. Moreover, in some embodiments, a composition described herein has a viscosity between about 2.00 cP and about 20,000 cP, between about 200 cP and about 10,000 cP, between about 1000 cP and about 15,000 cP, or between about 1000 cP and about 5000 cP measured according to ASTM standard D2983. In some embodiments, a composition has a viscosity between about 200 cP and about 50,000 cP at a temperature between about 20° C. and about 70° C. at 1 atm. In some embodiments, a composition has a viscosity between about 200 cP and about 25,000 cP, between about 200 cP and about 10,000 cP, or between about 1000 cP and about 5000 cP at a temperature between about 20° C. and about 70° C. at 1 atm. In some embodiments, a composition does not readily flow without the application of an external force or pressure, permitting the use of the composition in various applications requiring little or no flow. In some embodiments, a composition is self-supporting or non-encapsulated. Therefore, in some embodiments, compositions described herein can be used in various construction and engineering applications without the need for microencapsulation.

Moreover, in some embodiments, a composition has a viscosity between about 5000 cP and about 20,000 cP at a temperature between about −40° C. and about 40° C. at 1 atm or between about −30° C. and about 30° C. at 1 atm. In some embodiments, a composition has a viscosity between about 5000 cP and about 20,000 cP at a temperature between about −50° C. and about 0° C. at 1 atm or between about −20° C. and about 0° C. at 1 atm. In other embodiments, a composition has a viscosity between about 5000 cP and about 20,000 cP at a temperature between about 30° C. and about 50° C. at 1 atm or between about 35° C. and about 45° C. at 1 atm. Therefore, in some embodiments, a composition described herein can exhibit desirable properties in hot and/or cold environments.

II. Methods of Making a Composition Comprising a Phase Change Material

In another aspect, methods of making a composition comprising a phase change material are described herein. In some embodiments, a method of making a composition comprises providing a PCM, providing a hydrophobic sorption material, providing a viscosity modifier, and combining the PCM, hydrophobic sorption material, and viscosity modifier. In some embodiments, the hydrophobic sorption material and the viscosity modifier do not comprise the same material. In some embodiments, a method further comprises providing a linker component having a chemical functional group capable of forming a chemical bond with the PCM and combining the linker component with the PCM, hydrophobic sorption material, and viscosity modifier. In some embodiments, a method further comprises providing one or more additives and combining the one or more additives with the PCM, hydrophobic sorption material, and viscosity modifier. In some ernbodiments, a method described herein comprises providing a plurality of differing PCMs, hydrophobic sorption materials, viscosity modifiers, linker components, and/or additives. Moreover, in some embodiments, a PCM, hydrophobic sorption material, viscosity modifier, linker component, and/or additive can comprise any PCM, hydrophobic sorption material, viscosity modifier, linker component, and/or additive described hereinabove in Section I. In addition, in some embodiments, a method does not comprise providing water.

Further, combining a PCM, hydrophobic sorption material, and viscosity modifier, in some embodiments, comprises absorbing and/or adsorbing a PCM with a hydrophobic sorption material as described, for example, in Section I hereinabove. Moreover, combining can be carried out in any manner not inconsistent with the objectives of the present invention. In some embodiments, for instance, combining comprises mixing or stirring, including at a temperature greater than room temperature and/or greater than the melting point of one or more components of a composition described herein. In addition, in some embodiments, combining the PCM, hydrophobic sorption material, and viscosity modifier comprises first combining the PCM and the hydrophobic absorption material and then adding the viscosity modifier. Alternatively, in other embodiments, combining the PCM, hydrophobic sorption material, and viscosity modifier comprises first combining the PCM and the viscosity modifier and then adding the hydrophobic sorption material.

In addition, in some embodiments, a method described herein further comprises forming a gel. In some embodiments, forming a gel comprises partially encapsulating a PCM a hydrophobic sorption material. Moreover, in some embodiments, forming a gel does not comprise providing water. For example, in some embodiments, forming a gel comprises providing a cellulosic material or cellulose derivative but does not comprise providing water. In other embodiments, forming a gel comprises forming one or more chemical bonds between a PCM and a linker component. The one or more chemical bonds can comprise any chemical bond between a PCM and linker component described hereinabove in Section I, including a urethane bond, amide bond, or ester bond. In addition, in some embodiments, forming one or more chemical bonds comprises providing a catalyst. Any catalyst not inconsistent with the objectives of the present invention may be used. In some embodiments, a catalyst is selected based on the identity of one or more of a desired chemical bond, a solvent, a PCM, and a linker component. In some embodiments, a catalyst comprises a tertiary amine, such as triethylamine or triethanolamine. In other embodiments, a catalyst comprises an organometallic complex. In some embodiments, a catalyst comprises a metal complex comprising mercury, lead, tin, bismuth or zinc, including organometallic complexes. In some embodiments, a catalyst comprises a dibutyltin, such as dibutyltin laurate. Moreover, in some embodiments, a catalyst is provided in an amount less than about 0.1 weight percent. In some embodiments, a catalyst is provided in an amount between about 0.001 and about 0.1 weight percent.

A composition made by a method described herein, in some embodiments, can comprise a composition described hereinabove in Section I. Further, in some embodiments, a composition can comprise any component and/or have any property of a composition described hereinabove in Section I. For example, in some embodiments, a composition made by a method described herein is non-flammable or substantially non-flammable. In some embodiments, a composition made by a method described herein has a viscosity between about 5000 cP and about 20,000 cP and/or has a condensed phase latent heat between about 100 J/g and about 300 J/g. In some embodiments, a composition made by a method described herein is free or substantially free of water.

III. Methods of Making a Foam

In another aspect, methods of making a foam are described herein. In some embodiments, a method of making a foam comprises combining a phase change material (PCM) with a hydrophobic sorption material to provide a first mixture, combining a polyfunctional monomer with a linker component to provide a second mixture, and combining the first mixture with the second mixture. In some embodiments, combining a PCM with a hydrophobic sorption material comprises at least partially absorbing or adsorbing the PCM with the hydrophobic sorption material. For example, in some embodiments, a PCM comprises an absorbate and a hydrophobic sorption material comprises an absorbent. In other embodiments, a PCM comprises an adsorbate of the hydrophobic sorption material. Moreover, in some embodiments, combining a PCM with a hydrophobic sorption material comprises adsorbing or absorbing a hydrophobic portion of a PCM, such as an aliphatic hydrocarbon portion of a PCM.

Further, in some embodiments, combining a PCM with a hydrophobic sorption material comprises saturating the hydrophobic sorption material with the PCM. Saturating a hydrophobic sorption material with a PCM, in some embodiments, comprises utilizing all or substantially all of the absorbing and/or adsorbing capacity of the hydrophobic sorption material by absorbing and/or adsorbing the PCM with the hydrophobic sorption material. In some embodiments, saturating a hydrophobic sorption material with a PCM comprises providing an excess amount of PCM, such as an amount of PCM greater than the oil absorption capacity (DBP) of the hydrophobic sorption material. Further, a saturated hydrophobic sorption material, in some embodiments, is unable or substantially unable to absorb or adsorb additional chemical species, such as chemical species present in the combination of the first and second mixtures. For reference purposes herein, substantially all of the absorbing and/or adsorbing capacity of a substance comprises at least about 90 percent, at least about 95 percent, or at least about 99 percent of the substance's capacity.

In addition, in some embodiments, combining a PCM with a hydrophobic sorption material comprises partially encapsulating the PCM with the hydrophobic sorption material. Partially encapsulating a PCM with a hydrophobic sorption material, in some embodiments, does not comprise microencapsulating the PCM, such as with a polymer microcapsule.

Moreover, in some embodiments, combining a PCM with a hydrophobic sorption material comprises forming a gel. The gel comprises the PCM and the hydrophobic sorption material. Further, a gel, in some embodiments, comprises a continuous phase formed from the PCM. In other embodiments, a gel comprises a discontinuous phase formed from the PCM. A phase comprising a PCM, in some embodiments, can be a liquid phase or a solid phase. In addition, in some embodiments, a gel comprises a solid phase formed from a hydrophobic sorption material of the first mixture. The solid phase, in some embodiments, is a continuous phase. Further, in some embodiments, a gel does not comprise water or is substantially free of water. For reference purposes herein, a substance that is substantially free of water comprises less than about 10 weight percent, less than about 5 weight percent, less than about 1 weight percent, or less than about 0.1 weight percent water, based on the total weight of the substance.

Further, in some embodiments, a gel of a first mixture described herein has a viscosity between about 200 centipoise (cP) and about 20,000 cP, between about 200 cP and about 10,000 cP, between about 1000 cP and about 15,000 cP, or between about 1000 cP and about 5000 cP, measured according to ASTM standard D2983. Further, in some embodiments, a gel has a viscosity between about 200 cP and about 50,000 cP at a temperature between about 20° C. and about 70° C. at 1 atm. In some embodiments, a eel has a viscosity between about 200 cP and about 25,000, between about 200 cP and about 10,000 cP, or between about 1000 cP and about 5000 cP at a temperature between about 20° C. and about 70° C. at 1 atm. Moreover, in some embodiments, a gel has a viscosity between about 5000 cP and about 20,000 cP at a temperature between about −40° C. and about 40° C. at 1 atm or between about −30° C. and about 30° C. at 1 atm. In some embodiments, a gel has a viscosity between about 5000 cP and about 20,000 cP at a temperature between about −50° C. and about 0° C. at 1 atm or between about −20° C. and about 0° C. at 1 atm. In other embodiments, a gel has a viscosity between about 5000 cP and about 20,000 cP at a temperature between about 30° C. and about 50° C. at 1 atm or between about 35° C. and about 45° C. at 1 atm. In some embodiments, a gel does not readily flow without the application of an external force or pressure. In some embodiments, a gel is self-supporting or non-encapsulated.

Moreover, in some embodiments described herein, forming a gel comprises increasing the viscosity of the first mixture. In some embodiments, forming a gel comprises increasing the viscosity of the first mixture from below about 100 centipoise (cP) to above about 100 cP when measured according to ASTM standard D2983. In some embodiments, firming a gel comprises increasing the viscosity of the first mixture from below about 200 cP to above about 200 cP when measured according to ASTM standard D2983. In some embodiments, forming a gel comprises increasing the viscosity of the first mixture from below about 200 cP to between about 200 cP and about 25,000 cP, between about 200 cP and about 10,000 cP, between about 1000 cP and about 15,000 cP, or between about 1000 cP and about 5000 cP.

In addition, in some embodiments, combining a polyfunctional monomer with a linker component comprises forming a chemical bond between the polyfunctional monomer and the linker component. Further, in some embodiments, combining a polyfunctional monomer with a linker component comprises forming a pre polymer. A pre-polymer, in some embodiments, comprises a plurality of chemical bonds between a polyfunctional monomer and a linker component. In some embodiments, a pre-polymer is partially polymerized. A partially polymerized pre-polymer, in some embodiments, comprises at least one unpolymerized functional group available for additional polymerization. In some embodiments, a partially polymerized pre-polymer comprises a plurality of unpolymerized functional groups available for additional polymerization.

In addition, in some embodiments, a method described herein further comprises providing a second linker component. In some embodiments, the second linker component is added to the first mixture prior to combining the first mixture with the second mixture. In some embodiments, adding a second linker component to the first mixture comprises forming a chemical bond between the second linker component and the PCM of the first mixture. In some embodiments, the PCM is chemically bonded to the second linker component to provide a latent heat storage material. The latent heat storage material, in some embodiments, is non-polymeric. In some embodiments, the PCM is chemically bonded to the second linker component to provide an oligomeric latent heat storage material. For example, in some embodiments, a PCM comprises a monofunctional chemical species, such as a fatty alcohol, fatty acid, or alkyl ester of a fatty acid. In some embodiments, a second linker component comprises a polyfunctional chemical species, such as a polyfunctional isocyanate. A monofunctional chemical species of a PCM, in some embodiments, can be chemically bonded to a second linker component through a single functional group of the monofunctional chemical species, such as a carboxyl or hydroxyl group. Further, a polyfunctional chemical species of a second linker component, in some embodiments, can be chemically bonded to more than one chemical species of a PCM, including more than, one monofunctional chemical species. For example, in some embodiments, a bifunctional second linker component (B) can be chemically bonded to two monofunctional PCMs (A) to provide an A-B-A trimer. In other embodiments, a bifunctional second linker component is chemically bonded to one monofunctional PCM to provide an A-B dimer.

Moreover, in some embodiments described herein, combining a first mixture with a second mixture is carried out after forming a gel in the first mixture and/or forming a pre-polymer in the second mixture. Combining the first mixture with the second mixture after forming a gel in the first mixture and/or forming a pre-polymer in the second mixture, in some embodiments, permits non-competitive thickening of the first and second mixtures. In some embodiments, for example, the first mixture has a viscosity between about 200 cP and about 25,000 cP measured according to ASTM standard D2983 when combined with the second mixture. In some embodiments, the first mixture has a viscosity between about 200 cP and about 10,000 cP, between about 1000 cP and about 15,000 cP, or between about 1000 cP and about 5000 cP when combined with the second mixture. However, in some embodiments described herein, combining a first mixture with a second mixture is carried out before substantial polymerization has occurred in the second mixture. Substantial polymerization, for reference purposes herein, comprises at least about 30 percent polymerization or at least about 40 percent polymerization, based on the amount of available monomer. In some embodiments, polymerization in the second mixture is indicated by a temperature increase of the second mixture. In some embodiments, combining a first mixture with a second mixture is carried out soon after a temperature increase is observed in the second mixture, such as within about 5 minutes or within about 1 minute of a temperature increase of between about 5° C. and about 15° C.

In addition, in some embodiments, combining a first mixture with a second mixture comprises cross-linking one or more components of the first mixture with one or more components of the second mixture. For example, in some embodiments, a second linker component of the first mixture is cross-linked with a polyfunctional monomer or pre-polymer of the second mixture. In some embodiments, the linker component of the second mixture is cross-linked with a PCM or latent heat storage material of the first mixture. In some embodiments, a gel of the first mixture is cross-linked with a pre-polymer of the second mixture.

Further, in some embodiments, combining a first mixture with a second mixture is carried out at a temperature greater than a transition temperature of a PCM or latent heat storage material of the first mixture. The transition temperature, in some embodiments, comprises a solid-liquid transition temperature of a PCM or latent heat storage material described herein. In some embodiments, the transition temperature comprises a solid-solid or solid gel transition temperature of a PCM or latent heat storage material described herein. In some embodiments, a PCM or latent heat storage material at a temperature above a transition temperature described herein is unable to absorb thermal energy without a change in temperature of the PCM or latent heat storage material. In some embodiments, the latent heat storage capacity of a PCM or latent heat storage material is fully or substantially fully utilized prior to combining the first and second mixtures. Therefore, in some embodiments, the PCM or latent heat storage material is unable or substantially unable to absorb thermal energy needed for other processes, such as forming a foam. For reference purposes herein, substantially full utilization of the latent heat storage capacity of a substance comprises at least about 90 percent, at least about 95 percent, or at least about 99 percent utilization. Further, in some embodiments, a first mixture has a viscosity between about 200 cP and about 25,000 cP above a transition temperature described herein.

In addition, in some embodiments of methods described herein, a first mixture is free or substantially free of water. In some embodiments, a second mixture is free or substantially free of water. Moreover, in some embodiments, a first mixture and a second mixture are both free or substantially free of water, including when the first mixture and the second mixture are combined.

A method described herein, in some embodiments, further comprises providing a catalyst. Providing a catalyst, in some embodiments, comprises adding a catalyst to the first mixture, such as when the first mixture comprises a second linker component. In other embodiments, providing a catalyst comprises adding a catalyst to the second mixture. In some embodiments, providing a catalyst comprises adding a first catalyst to the first mixture and adding a second catalyst to the second mixture. Further, in some embodiments, providing a catalyst comprises adding a catalyst to the combination of the first and second mixtures. Adding a catalyst to a mixture or combination of mixtures described herein, in some embodiments, facilitates additional reaction between one or more components of the mixture or combination of mixtures. For example, in some embodiments, adding a catalyst facilitates additional polymerization, gelling, and/or cross-linking. Further, in some embodiments, adding a catalyst to the first and/or second mixture, prior to combining the first and second mixtures provides separate mixtures having desired viscosities, including a viscosity corresponding to partial polymerization and/or gelling.

In addition, a method described herein, in some embodiments, further comprises providing a blowing agent. A blowing agent, in some embodiments, is added to the combination of the first and second mixtures. Adding a blowing agent to the combination of the first and second mixtures, in some embodiments, facilitates the formation of a foam.

A method described herein, in some embodiments, further comprises providing an aqueous polymeric material. In some embodiments, providing an aqueous polymeric material comprises adding the aqueous polymeric material to the combination of the first and second mixtures. An aqueous polymeric material, in some embodiments, comprises an organic polymer or biopolymer dispersed in water. In some embodiments, the polymer is at least partially water soluble. In other embodiments, the polymer is suspended in water. Further, in some embodiments, an aqueous polymeric material described herein acts as a blowing agent.

Moreover, in some embodiments, a method described herein further comprises providing one or more additives. One or more additives, in some embodiments, are added to the first mixture. In some embodiments, one or more additives are added to the second mixture. In some embodiments, one or more additives are added to the combination of the first and second mixtures. Further, in some embodiments, an additive described herein provides one or more properties to a foam made by a method described herein. In some embodiments, for instance, an additive provides thermal conductivity modulation, antimicrobial activity, or fire resistance.

Turning now to specific steps of methods, methods described herein comprise combining a PCM with a hydrophobic sorption material to provide a first mixture. Combining a PCM with a hydrophobic sorption material can be carried out in any manner not inconsistent with the objectives of the present invention. For example, in some embodiments, combining is carried out using a line addition process using one or more lines. In some embodiments, combining comprises mixing or stirring. Mixing or stirring can be carried out at any temperature not inconsistent with the objectives of the present invention. In some embodiments, mixing or stirring is carried out at a temperature greater than room temperature. In some embodiments, mixing or stirring is carried out at a temperature greater than a state or phase transition temperature of one or more components of the first mixture, such as a melting point. Moreover, mixing or stirring can be carried out for any duration not inconsistent with the objectives of the present invention. In some embodiments, for instance, mixing or stirring is carried out for less than about 60 minutes, less than about 30 minutes, or less than about 10 minutes. In some embodiments, mixing or stirring is carried out for a duration between about 1 minute and about 60 minutes, between about 10 minutes and about 50 minutes, or between about 20 minutes and about 40 minutes. Further, in some embodiments, the temperature and duration of mixing or stirring is selected based on a desired viscosity of the first mixture and/or the identity or reactivity of one or more components of the first mixture.

In addition, any PCM not inconsistent with the objectives of the present invention may be used. In some embodiments, a PCM does not comprise a microcapsule or microencapsulation agent and/or is not encapsulated. Further, in some embodiments, a PCM is non-polymeric. In some embodiments, a PCM comprises a monofunctional chemical species. For example, in some embodiments, a PCM comprises a fatty acid. A fatty acid, in some embodiments, can have a C4 to C28 aliphatic hydrocarbon tail. Further, in some embodiments, the hydrocarbon tail is saturated. Alternatively, in other embodiments, the hydrocarbon tail is unsaturated. In some embodiments, the hydrocarbon tail can be branched or linear. Non-limiting examples of fatty acids suitable for use in some embodiments described herein include caprylic acid, capric acid, lauric acid, myristic acid, palmitic acid, stearic acid, arachidic acid, behenic acid, lignoceric acid, and cerotic acid. In some embodiments, a PCM described herein comprises a plurality of differing fatty acids.

In some embodiments, a PCM comprises an alkyl ester of a fatty acid. Any alkyl ester not inconsistent with the objectives of the present invention may be used. For instance, in some embodiments, an alkyl ester comprises a methyl, ethyl, propyl, or butyl ester of a fatty acid described herein. In other embodiments, an alkyl ester comprises a C2 to C6 ester alkyl backbone or a C6 to C12 ester alkyl backbone. In some embodiments, an alkyl ester comprises a C12 to C28 ester alkyl backbone. Further, in some embodiments, a PCM described herein comprises a plurality of differing alkyl esters of fatty acids. Non-limiting examples of alkyl esters of fatty acids suitable for use in some embodiments described herein include methyl laurate, methyl myristate, methyl palmitate, methyl stearate, methyl palmitoleate, methyl oleate, methyl linoleate, methyl docosahexanoate, and methyl ecosapentanoate. In some embodiments, the corresponding ethyl, propyl, or butyl esters may also be used.

In some embodiments, a PCM comprises a fatty alcohol. Any fatty alcohol not inconsistent with the objectives of the present invention may be used. For instance, a fatty alcohol, in some embodiments, can have a C4 to C28 aliphatic hydrocarbon tail. Further, in some embodiments, the hydrocarbon tail is saturated. Alternatively, in other embodiments, the hydrocarbon tail is unsaturated. In some embodiments, the hydrocarbon tail can be branched or linear. Non-limiting examples of fatty alcohols suitable for use in some embodiments described herein include capryl alcohol, pelargonic alcohol, capric alcohol, undecyl alcohol, lauryl alcohol, tridecyl alcohol, myristyl alcohol, pentadecyl alcohol, cetyl alcohol, heptadecyl alcohol, stearyl alcohol, nonadecyl alcohol, arachidyl alcohol, heneicosyl alcohol, behenyl alcohol, lignoceryl alcohol, ceryl alcohol, and montanyl alcohol. In some embodiments, a PCM comprises a plurality of differing fatty alcohols.

In some embodiments, a PCM comprises a fatty sulfonate or phosphonate. Any fatty sulfonate or phosphonate not inconsistent with the objectives of the present invention may be used. In some embodiments, a PCM comprises a C4 to C28 alkyl sulfonate or phosphonate. In some embodiments, a PCM comprises a C4 to C28 alkenyl sulfonate or phosphonate. Further, in some embodiments, a PCM comprises a polyethylene glycol. Any polyethylene glycol not inconsistent with the objectives of the present invention may be used.

In some embodiments, a PCM comprises a paraffin. Any paraffin not inconsistent with the objectives of the present invention may be used. In some embodiments, a paraffin comprises an n-alkane. In some embodiments, a paraffin comprises a C10 to C60 alkane. In some embodiments, a paraffin comprises a C20 to C50 alkane or a C30 to C40 alkane. In some embodiments, a paraffin comprises a C10 to C30 alkane or a C14 to C28 alkane. Non-limiting examples of paraffins suitable for use in some embodiments described herein include n-dodecane, n-tridecane, n-tetradecane, n-pentadecane, n-hexadecane, n-heptadecane, n-octadecane, n-nonadecane, n-icosane, n-henicosane, n-docosane, n-tricosane, n-tetracosane, n-pentacosane, n-hexacosane, n-heptacosane, n-octacosane, n-nonacosane, n-triacontane, n-hentriacontane, n-dotriacontane, n-tritriacontane, and/or mixtures thereof.

In some embodiments, a PCM comprises a salt hydrate. Any salt hydrate not inconsistent with the objectives of the present invention may be used. Non-limiting examples of salt hydrates suitable for use in some embodiments described herein include $KF \cdot 4H_2O$, $Mn(NO_3)_2 \cdot 6H_2O$, $CaCl_2 \cdot 6H_2O$, $CaBr_2 \cdot 6H_2O$, $Li(NO_3) \cdot 6H_2O$, $Na_2SO_4 \cdot 10H_2O$, $Na_2CO_3 \cdot 10H_2O$, $Na_2HPO_4 \cdot 12H_2O$, $Zn(NO_3)_2 \cdot 6H_2O$, $Ca(NO_3)_2 \cdot 3H_2O$, $Na(NO_3)_2 \cdot 6H_2O$, $Zn(NO_3)_2 \cdot 2H_2O$, $FeCl_3 \cdot 2H_2O$, $Co(NO_3)_2 \cdot 6H_2O$, $Ni(NO_3)_2 \cdot 6H_2O$, $MnCl_2 \cdot 4H_2O$, $CH_3COONa \cdot 3H_2O$, $LiC_2H_3O_2 \cdot 2H_2O$, $MgCl_2 \cdot 4H_2O$, $NaOH \cdot H_2O$, $Cd(NO_3)_2 \cdot 4H_2O$, $Cd(NO_3)_2 \cdot 1H_2O$, $Fe(NO_3)_2 \cdot 6H_2O$, $NaAl(SO_4)_2 \cdot 12H_2O$, $FeSO_4 \cdot 7H_2O$, $Na_3PO_4 \cdot 12H_2O$, $Na_2B_4O_7 \cdot 10H_2O$, $Na_3PO_4 \cdot 12H_2O$, $LiCH_3COO \cdot 2H_2O$, and/or mixtures thereof.

In some embodiments, a PCM described herein comprises a plurality of differing chemical species. Any combination of differing chemical species not inconsistent with the objectives of the present invention may be used. In some embodiments, for example, a PCM comprises one or more fatty acids and one or more fatty alcohols. Moreover, in some embodiments comprising a PCM comprising a plurality of differing chemical species, the plurality of chemical species comprises between about 1 and about 99 weight percent fatty acid based on the total weight of the plurality of chemical species. In some embodiments, the plurality comprises between about 10 and about 90 weight percent, between about 20 and about 80 weight percent, between about 30 and about 70 weight percent, or between about 50 and about 90 weight percent fatty acid. In some embodiments, a plurality of chemical species comprises between about 1 and about 99 weight percent alkyl ester of a fatty acid. In some embodiments, the plurality comprises between about 10 and about 90 weight percent, between about 20 and about 80 weight percent, between about 30 and about 70 weight percent, or between about 50 and about 90 weight percent alkyl ester at a fatty acid. Further, in some embodiments, plurality of chemical species comprises between about 1 and about 99 weight percent fatty alcohol. In some embodiments, the plurality comprises between about 10 and about 90 weight percent, between about 20 and about 80 weight percent, between about 30 and about 70 weight percent, between about 5 and about 50 weight percent, or between about 5 and about 25 weight percent fatty alcohol.

Further, in some embodiments, plurality of differing chemical species of a PCM selected based on a desired viscosity and/or latent heat of the PCM or a latent heat storage material comprising the PCM. In some embodiments, a plurality of differing chemical species is selected based on a desired state or phase transition temperature of a PCM or latent heat storage material. A state or phase transition temperature, in some embodiments, is between about −50° C. and about 100° C. at 1 atm, between about −50° C. and about 50° C. at 1 atm, or between about −40° C. and about 40° C. at 1 atm. In some embodiments, a state or phase transition temperature is between about −50° C. and about 0° C. at 1 atm or between about −20° C. and about 0° C. at 1 atm. In some embodiments, a state or phase transition temperature is between about 0° C. and about 70° C. at 1 atm or between about −4° C. and about 40° C. at 1 atm. In other embodiments, a state or phase transition temperature is between about 30° C. and about 50° C. at 1 atm or between about 35° C. and about 45° C. at 1 atm.

A PCM described herein can be present in a first mixture in any amount not inconsistent with the objectives of the present invention. In some embodiments, for instance, a first mixture comprises up to about 80 weight percent or up to about 90 weight percent PCM based on the total weight of the first mixture. In some embodiments, a first mixture comprises up to about 95 weight percent or up to about 99 weight percent PCM. In some embodiments, a first mixture comprises between about 50 weight percent and about 99 weight percent, between about 70 weight percent and about 95 weight percent, or between about 80 weight percent and about 90 weight percent PCM. In some embodiments, a first mixture comprises between about 90 weight percent and about 99 weight percent PCM.

Moreover, a PCM or latent heat storage material described herein can be present in the combination of the first and second mixtures in any amount not inconsistent with the objectives of the present invention. For example, in some embodiments, the combination of the first and second mixtures comprises up to about 60 weight percent PCM or latent heat storage material. In some embodiments, the combination of the first and second mixtures comprises up to about 50 weight percent PCM or latent heat storage material. In some embodiments, the combination of the first and second mixtures comprises between about 1 weight percent and about 60 weight percent, between about 10 weight percent and about 50 weight percent, between about 20 weight percent and about 40 weight percent, or between about 20 weight percent and about 30 weight percent PCM or latent heat storage material.

In addition, a hydrophobic sorption material of a first mixture described herein can comprise any chemical species not inconsistent with the of the present invention. In some embodiments, for instance, a hydrophobic sorption material comprises an aerogel. Any aerogel not inconsistent with the objectives of the present invention may be used. An aerogel, in some embodiments, comprises an organic composition such as agar. In some embodiments, an aerogel comprises carbon. In some embodiments, an aerogel comprises alumina. In some embodiments, an aerogel comprises silica, including fumed silica. Moreover, an aerogel comprising fumed silica, in some embodiments, comprises particles having a size from about 1 μm to about 10 mm. In some embodiments, the particles have a size from about 1 μm to about 100 μm, from about 1 μm to about 10 μm, or from about 5 μm to about 10 μm. Further, in some embodiments, an aerogel has high porosity. For instance, in some embodiments, an aerogel comprises over 90 percent air. In addition, in some embodiments, an aerogel comprises pores having a size between about 1 nm and about 100 nm. In some embodiments, the pores have a size between about 10 nm and about 100 nm or between about 20 nm and about 40 nm. Moreover, an aerogel described herein, in some embodiments, has a high surface area, such as a surface area of about 500 m$^2$/g or more. In some embodiments, an aerogel has a surface area between about 500 m$^2$/g and about 1000 m$^2$/g or between about 600 m$^2$/g and about 900 m$^2$/g. In addition, in some embodiments, an aerogel has a low tap density. In some embodiments, for instance, an aerogel has a tap density less than about 500 kg/m$^3$ or less than about 100 kg/m$^3$. In some embodiments, an aerogel has a tap density between about 1 kg/m$^3$ and about 200 kg/m$^3$ or between about 10 kg/m$^3$ and about 100 kg/m$^3$. Further, in some embodiments, an aerogel described herein has a low thermal conductivity. In some embodiments, an aerogel has a thermal conductivity less than about 50 mW/mK or less than about 20 mW/mK. In some embodiments, an aerogel has a thermal conductivity between about 1 mW/mK and about 20 mW/mK or between about 5 mW/mK and about 15 mW/mK. Moreover, in some embodiments, an aerogel has a hydrophobic surface. In addition, in some embodiments, an aerogel has a high oil absorption capacity (DBP). In some embodiments, an aerogel has an oil absorption capacity greater than about 100 g/100 g. In some embodiments, an aerogel has an oil absorption capacity greater than about 500 g/100 g. In some embodiments, an aerogel has an oil absorption capacity between about 100 g/100 g and about 1000 g/100 g, between about 300 g/100 g and about 800 g/100 g, or between about 400 g/100 g and about 600 g/100 g. Further, in some embodiments, an aerogel has a specific heat capacity between about 0.1 kJ/(kg K) and about 5 kJ/(kg K). In some embodiments, an aerogel has a specific specific heat capacity between about 0.5 kJ/(kg K) and about 1.5 kJ/(kg K).

In other embodiments, a hydrophobic sorption material comprises a polymeric material. Any polymeric material not inconsistent with the objectives of the present invention may be used. In some embodiments, a polymeric material comprises an organic composition. For example, in some embodiments, a polymeric material comprises a polyolefin such as polyethylene or polypropylene, a polycarbonate, a polyester, or a polyurethane. In some embodiments, a polymeric material comprises polyvinyl alcohol (PVA). In some embodiments, a polymeric material comprises an acrylonitrile, including a polyacrylonitrile or acrylonitrile copolymer. An acrylonitrile copolymer, in some embodiments, comprises styrene-acrylonitrile (SAN), acrylonitrile styrene acrylate (ASA), acrylonitrile butadiene (NBR), or acrylonitrile butadiene styrene (ABS). In some embodiments, a hydrophobic sorption material comprises a particulate polymeric material, such as ABS grains.

In some embodiments, a polymeric material comprises a styrene block copolymer (SBC). A styrene block copolymer, in some embodiments, comprises a linear triblock copolymer. The linear triblock copolymer, in some embodiments, comprises an A-B-A structure, where the A blocks comprise polystyrene and the B block comprises an elastomer. In some embodiments, an SBC comprises between about 20 percent and about 40 percent polystyrene. In some embodiments, an SBC comprises between about 25 percent and about 35 percent polystyrene. Further, in some embodiments, an SBC can be maleated or unmaleated. Moreover, in some embodiments, an SBC has an average molecular weight greater than about 75,000. In some embodiments, an SBC has an average molecular weight greater than about 200,000. In some embodiments, an SBC has an average molecular weight between about 75,000 and about 1,000,000, between about 75,000 and about 500,000, or between about 100,000 and about 300,000. For reference purposes herein, molecular weight comprises weight average molecular weight. In addition, in some embodiments, an SBC has a specific gravity less than about 1. In some embodiments, an SBC has a Shore A hardness between about 50 and about 100. In some embodiments, an SBC has a Shore A hardness between about 50 and about 75 or between about 55 and about 70. Non-limiting examples of SBCs useful in some embodiments described herein include styrene-ethylene-butylene-styrene, styrene-ethylene-propylene-styrene, styrene-ethylene-ethylene/propylene-styrene, styrene-isobutylene-styrene, styrene-butadiene-styrene, styrene-isoprene-styrene, and combinations thereof. Commercially available SBCs useful in some embodiments described herein include SBCs provided by Kraton Polymers (Houston, Tex.), such as Kraton G1651HU, Kraton G1650, Kraton G1652, and Kraton G1654H.

In some embodiments, a polymeric material comprises a biopolymer. For instance, in some embodiments, a polymeric material comprises cellulose or a cellulosic material or cellulose derivative. In some embodiments, a polymeric material comprises hydroxymethyl cellulose (HMC), hydroxyethyl cellulose (HEC), hydroxypropyl cellulose (HPC), hydroxypropylmethyl cellulose (HPMC), hydroxypropyl methylcellulose phthalic ester (HPMCP), methyl cellulose (MC), ethyl cellulose (EC), carboxymethyl cellulose (CMC), and/or polyanionic cellulose (PAC). In some embodiments, a cellulosic material or cellulose derivative has a molecular weight between about 100,000 and about 2,000,000. In some embodiments, a cellulosic material or cellulosic derivative has a molecular weight between about 250,000 and about 1,500,000, between about 250,000 and about 450,000, between about 750,000 and about 950,000, or between about 1,000,000 and about 1300,000. Further, in some embodiments, a polymeric material comprises chitosan. In some embodiments, the chitosan has a molecular weight between about 3000 and about 20,000. Further, in some embodiments, the chitosan has a degree of deacetylation between about 50 percent and about 100 percent.

In some embodiments, a hydrophobic sorption material comprises a zeolite. Any zeolite not inconsistent with the objectives of the present invention may be used. In some embodiments, a zeolite comprises a natural zeolite. In other embodiments, a zeolite comprises an artificial zeolite. In some embodiments, a zeolite comprises a silicate and/or aluminosilicate. In some embodiments, a zeolite comprises a composition according to the formula $M_{x/n}$ [(AlO$_2$)$_x$ (SiO$_2$)$_y$]·w H$_2$O, where n is the valence of cation M (e.g., Na$^+$, K$^+$, Ca$^{2+}$, or Mg$^{2+}$), w is the number of water molecules per unit cell, and x and y are the total number of tetrahedral atoms per unit cell. Non-limiting examples of zeolites suitable for use in some embodiments described herein include analcime ((K,Ca,Na)AlSi$_2$O$_6$·H$_2$O), chabazite ((Ca,Na$_2$,K$_2$,Mg)Al$_2$Si$_4$O$_{12}$·6H$_2$O), clinoptilolite ((Na, K,Ca)$_{2-3}$Al$_3$(Al, Si)$_2$Si$_{13}$O$_{36}$·12H$_2$O), heulandite ((Ca, Na)$_{2-3}$Al$_3$(Al,Si)$_2$Si$_{13}$O$_{36}$·12H$_2$O), natrolite (Na$_2$Al$_2$Si$_3$O$_{10}$·2H$_2$O), phillipsite ((Ca,Na$_2$,K$_2$)$_3$Al$_6$Si$_{10}$O$_{32}$·12H$_2$O), and stilbite (NaCa$_4$(Si$_{27}$Al$_9$)O$_{72}$·28 (H$_2$O)).

Further, in some embodiments, a method described herein comprises providing a plurality of differing hydrophobic sorption materials. Any combination of differing hydrophobic sorption materials not inconsistent with the objectives of the present invention may be used. For instance, in some embodiments, a first mixture comprises an aerogel and a polymeric material. In some embodiments, a first mixture comprises one or more aerogels, one or more polymeric materials, and/or one or more zeolites. Further, in some embodiments, a plurality of differing hydrophobic sorption materials of a first mixture is selected based on a desired viscosity of the first mixture.

In addition, a hydrophobic sorption material or plurality of hydrophobic sorption materials described herein can be present in a first mixture in any amount not inconsistent with the objectives of the present invention. In some embodiments, for instance, a first mixture described herein comprises less than about 20 weight percent hydrophobic sorption material. In some embodiments, a first mixture comprises less than about 10 weight percent, less than about 5 weight percent, less than about 3 weight percent, less than about 2 weight percent, or less than about 1 weight percent hydrophobic sorption material. In some embodiments, a first mixture comprises between about 1 weight percent and about 20 weight percent, between about 1 weight percent and about 10 weight percent, between about 1 weight percent and about 5 weight percent, or between about 5 weight percent and about 10 weight percent hydrophobic sorption material.

Methods described herein, in some embodiments, also comprise providing a second linker component. The second linker component can comprise any chemical species not inconsistent with the objectives of the present invention. In some embodiments, for instance, a second linker component comprises a polyfunctional chemical species, including a bifunctional chemical species. A polyfunctional chemical species, in some embodiments, comprises more than one functional group capable of forming a chemical bond with a PCM described herein, such as an isocyanate group or hydroxyl group. Moreover, a chemical bond between a PCM and a second linker component can comprise any chemical bond not inconsistent with the objectives of the present invention. In some embodiments, for example, a chemical bond comprises a covalent bond. In other embodiments, a chemical bond comprises an ionic bond, or electrostatic bond. In some embodiments, a chemical bond comprises a hydrogen bond. In some embodiments, a chemical bond comprises a urethane bond. In other embodiments, a chemical bond comprises an amide bond. In some embodiments, a chemical bond comprises an ester bond.

In some embodiments, a second linker component comprises an isocyanate. In some embodiments, a second linker component comprises a diisocyanate, such as a methylene diphenyl diisocyanate (MDI), toluene diisocyanate (TDI), naphthalene diisocyanate (NDI), isophorone diisocyanate (IPDI), and/or hexamethylene diisocyanate (HDI). Non-limiting examples of diisocyanates suitable for use in some embodiments described herein include Lupranate® LP27, LP30, LP30D, M, MI, MS, M10, M20, M20S, M20FB, M20HB, M20SB, M70L, MM103, MP102, MS, R2500, R2500U, T80-Type 1, T80-Type 2, TF2115, 78, 81, 219, 223, 227, 230, 234, 245, 259, 265, 266, 273, 275, 278, 280, 281, 5010, 5020, 5030, 5040, 5050, 5060, 5070, 5080, 5090, 5100, 5110, 5140, 5143, and 8020, all commercially available from BASF. Other non-limiting examples of diisocyanates suitable for use in some embodiments described herein include Suprasec® 2004, 2029, 5025, 7316, 7507, 9150, 9561, 9577, 9582, 9600, 9603, 9608, 9612, 9610, 9612, 9615, and 9616 as well as Rubinate® 1209, 1234, 1670, 1790, 1920, 9040, 9214, 9236, 9271, 9272, 9465, and 9511, a commercially available from Huntsman. Other major producers of diisocyanates include Bayer, BorsodChem, Dow Mitsui, Nippon Polyurethane Industry and Yantai Wanhua.

In other embodiments, a second linker component comprises a polyol. In some embodiments, a second linker component comprises a saccharide, including a monosaccharide disaccharide, oligosaccharide, or polysaccharide. A polysaccharide, in some embodiments, comprises cellulose or a cellulose derivative. Further, in some embodiments, a second linker component comprises a sugar alcohol, such as glycol, glycerol, erythritol, threitol, arabitol, xylitol, ribitol, mannitol, sorbitol, dulcitol, iditol, isomalt, maltitol, or lactitol.

A second linker component described herein can be present in a first mixture in any amount not inconsistent with the objectives of the present invention. In some embodiments, for instance, a first mixture described herein comprises less than about 10 weight percent second linker component. In some embodiments, a first mixture comprises less than about 5 weight percent, less than about 3 weight percent, less than about 2 weight percent, or less than about 1 weight percent second linker component. In some embodiments, a second mixture comprises between about 1 weight percent and about 5 weight percent or between about 1 weight percent about 8 weight percent second linker component. Further, in some embodiments, a first mixture comprises less second linker component than PCM. For example, in some embodiments, the ratio of PCM to second linker component is greater than about 2:1, greater than about 5:1, greater than about 10:1, greater than about 20:1, or greater than about 40:1 by weight. In some embodiments, the ratio of PCM to second linker component is between about 2:1 and about 50:1 or between about 5:1 and about 30:1.

Methods described herein also comprise combining a polyfunctional monomer with a linker component to provide a second mixture. Combining a polyfunctional monomer with a linker component can be carried out in any manner not inconsistent with the objectives of the present invention. For example, in some embodiments, combining is carried out using a line addition process using one or more lines. In some embodiments, combining comprises mixing or stirring. Mixing or stirring can be carried out at any temperature not inconsistent with the objectives of the present invention. In some embodiments, mixing or stirring is carried out at a temperature greater than room temperature. In some embodiments, mixing or stirring is carried out at a temperature greater than a state or phase transition temperature of one or more components of the second mixture, such as a melting point. Moreover, mixing or stirring can be carried out tor any duration not inconsistent with the objectives of the present invention. In some embodiments, for instance, mixing or stirring is carried out for less than about 60 minutes, less than about 30 minutes, or less than about 10 minutes. In some embodiments, mixing or stirring is carried out for a duration between about 1 minute and about 60 minutes, between about 10 minutes and about 50 minutes, or between about 20 minutes and about 40 minutes. Further, in some embodiments, the temperature and duration of mixing or stirring is selected based on a desired viscosity of the second mixture and/or the identity or reactivity of one or more components of the second mixture.

In addition, any polyfunctional monomer not inconsistent with the objectives of the present invention may be used. A polyfunctional monomer, in some embodiments, comprises more than one polymerizable functional group, such as an isocyanate group or hydroxyl group. In some embodiments, a polyfunctional monomer comprises a polyurethane monomer, such as a polyol. Any polyol not inconsistent with the objectives of the present invention may be used. In some embodiments, a polyol comprises a diol. In some embodiments, a polyol comprises a triol. In some embodiments, for example, a polyol comprises castor oil. In some embodiments, a polyol comprises a polymer or oligomer. In some embodiments, for instance, a polyol comprises a polyether polyol. In some embodiments, a polyol comprises a poly(tetramethylene ether) glycol. In some embodiments, a polyol comprises a polyester polyol. In some embodiments, a polyol comprises a graft polyol or filled polyol. A graft polyol or tilled polyol, in some embodiments, comprises a styrene-acrylonitrile, acrylonitrile, or polyurea polymer chemically grafted to a polyether backbone. In some embodiments, a polyol comprises a fluorinated polyol. Further, in some embodiments, a polyol has a molecular weight greater than about 100. In some embodiments, a polyol has a molecular weight greater than about 1000 or greater than about 2000. In some embodiments, a polyol has a molecular weight between about 100 and about 1000, between about 200 and about 800, or between about 300 and about 700. In some embodiments, a polyol has a molecular weight between about 500 and about 2500 or between about 700 and about 2000. In some embodiments, a polyol has a molecular weight ranging from about 1000 to about 10,000 or from about 2000 to about 10,000. Moreover, in some embodiments, a polyol has a polydisperse molecular weight. Further, in some embodiments, a polyfunctional monomer described herein comprises a plurality of differing polyols. In some embodiments, a plurality of differing polyols is selected based on a desired density, flexibility, or mechanical strength of a foam made by a method described herein.

A polyfunctional monomer described herein can be present in the second mixture in any amount not inconsistent with the objectives of the present invention. In some embodiments, for instance, a second mixture comprises up to about 70 weight percent or up to about 80 weight percent polyfunctional monomer. In some embodiments, a second mixture comprises between about 20 weight percent and about 80 weight percent, between about 30 weight percent and about 70 weight percent, or between about 40 weight percent and about 60 weight percent polyfunctional monomer.

In addition, a linker component of a second mixture described herein can comprise any chemical species not inconsistent with the objectives of the present invention. In some embodiments, for instance, a linker component comprises a polyfunctional chemical species, including a bifunctional chemical species. A polyfunctional chemical species, in some embodiments, comprises more than one functional group capable of forming a chemical bond with a polyfunctional monomer described herein, such as an isocyanate or carboxyl group. Moreover, a chemical bond between a polyfunctional monomer and a linker component described herein can comprise any chemical bond not inconsistent with the objectives of the present invention. In some embodiments, for example, a chemical bond comprises a covalent bond. In other embodiments, a chemical bond comprises an ionic bond or electrostatic bond. In some embodiments, a chemical bond comprises a hydrogen bond. In some embodiments, a chemical bond comprises a urethane bond. In some embodiments, a chemical bond comprises an ester bond.

In some embodiments, a linker component comprises an isocyanate, including a polyfunctional isocyanate. In some embodiments, a linker component comprises a diisocyanate, such as a methylene diphenyl diisocyanate (MDI), toluene diisocyanate (TDI), naphthalene diisocyanate (NDI), isophorone diisocyanate (IPDI), and/or hexamethylene diisocyanate (HDI). Non-limiting examples of diisocyanates suitable for use in some embodiments described herein include Lupranate® LP27, LP30, LP30D, M, MI, MS, M10, M20, M20S, M20FB, M20HB, M20SB, M70L, MM103, MP102, MS, R2500, R2500U, T80-Type 1, T80-Type 2, TF2115, 78, 81, 219, 223, 227, 230, 234, 245, 259, 265, 266, 273, 275, 278, 280, 281, 5010, 5020, 5030, 5040, 5050, 5060, 5070, 5080, 5090, 5100, 5110, 5140, 5143, and 8020, all commercially available from BASF. Other non-limiting examples of diisocyanates suitable for use in some embodiments described herein include Suprasec® 2004, 2029, 5025, 7316, 7507, 9150, 9561, 9577, 9582, 9600, 9603, 9608, 9612, 9610, 9612, 9615, and 9616 as well as Rubinate® 1209, 1234, 1670, 1790, 1920, 9040, 9234, 9236, 9271, 9272, 9465, and 9511, all commercially available from Huntsman.

In some embodiments, a linker component comprises a carboxylic acid, including a dicarboxylic acid. Any dicarboxylic acid not inconsistent with the objectives of the present invention be used.

A linker component described herein can be present in a second mixture in any amount not inconsistent with the objectives of the present invention. In some embodiments, for instance, a second mixture described herein comprises less than about 80 weight percent linker component. In some embodiments, a second mixture comprises less than about 70 weight percent, less than about 60 weight percent, less than about 50 weight percent, or less than about 40 weight percent linker component. In some embodiments, a second mixture comprises between about 20 weight percent and about 80 weight percent linker component or between about 30 weight percent about 70 weight percent linker component.

Methods described herein also comprise combining a first mixture with a second mixture. The first and second mixtures can be combined in any manner not inconsistent with the objectives of the present invention. For example, in some embodiments, combining comprises mixing or stirring. Mixing or stirring can be carried out at any temperature not inconsistent with the objectives of the present invention. In some embodiments, mixing or stirring is carried out at a temperature greater than room temperature. In some embodiments, mixing or stirring is carried out at a temperature greater than a state or phase transition temperature of one or more components of the first and/or second mixture, such as a melting point. Moreover, mixing or stirring can be carried out for any duration not inconsistent with the objectives of the present invention. In some embodiments, for instance, mixing or stirring is carried out for less than about 60 minutes, less than about 30 minutes, or less than about 10 minutes. In some embodiments, mixing or stirring is carried out for a duration between about 1 minute and about 60 minutes, between about 10 minutes and about 50 minutes, or between about 20 minutes and about 40 minutes. Further, in some embodiments, the temperature and duration of mixing or stirring is selected based on a desired property of a foam and/or the identity or reactivity of one or more components of the first mixture and/or second mixture.

Moreover, the first and second mixtures can be combined in any ratio not inconsistent with the objectives of the present invention. In some embodiments, for instance, the weight ratio of the first mixture to the second mixture is between about 1:100 and about 2:1. In some embodiments, the weight ratio of the first mixture to the second mixture is between about 1:50 and about 1:1. In some embodiments, the weight ratio of the first mixture to the second mixture is between about 1:20 and about 1:1, between about 1:10 and about 1:1, between about 1:5 and about 1:1, or between about 1:5 and about 2:1.

Methods described herein, in some embodiments, further comprise providing a catalyst. A catalyst can be provided in any manner not inconsistent with the objectives of the present invention. In some embodiments, for instance, providing a catalyst comprises providing a catalyst powder. Moreover, in some embodiments, a catalyst is provided in an amount less than about 0.1 weight percent of the mixture or combination of mixtures to which the catalyst is added. In some embodiments, a catalyst is provided in an amount between about 0.001 and about 0.1 weight percent.

Further, any catalyst not inconsistent with the objectives of the present invention may he used. In some embodiments, a catalyst is selected based on a desired chemical bond and/or reaction rate. For example, in some embodiments, a catalyst comprises a urethane catalyst. In some embodiments, a catalyst comprises a tertiary amine, such as triethylamine or triethanolamine. In other embodiments, a catalyst comprises an organometallic complex. In some embodiments, a catalyst comprises a metal complex comprising mercury, lead, tin, bismuth or zinc, including organometallic complexes. In some embodiments, a catalyst comprises a dibutyltin, such as dibutyltin laurate.

In addition, in some embodiments, a method described herein further comprises providing a blowing agent. A blowing agent can be provided in any manner not inconsistent with the objectives of the present invention. In some embodiments, a blowing agent is provided as a liquid. In some embodiments, a blowing agent is provided as a gas. Moreover, in some embodiments, a blowing agent is provided in an amount less than about 0.1 weight percent of the combination of the first and second mixtures. In some embodiments, a blowing agent is provided in an amount between about 0.001 and about 0.1 weight percent. Further, any blowing agent not inconsistent with the objectives of the present invention may be used. In some embodiments, for instance, a blowing agent comprises water. In some embodiments, a blowing agent comprises a halocarbon. In some embodiments, a blowing agent comprises a hydrocarbon. In some embodiments, a blowing agent comprises carbon dioxide.

Methods described herein, in some embodiments, further comprise providing an aqueous polymeric material. An aqueous polymeric material can be provided in any manner not inconsistent with the objectives of the present invention. In some embodiments, providing an aqueous polymeric material comprises adding the aqueous polymeric material to the combination of the first and second mixtures. Further, in some embodiments, an aqueous polymeric material is added to the combination of the first and second mixtures after a catalyst is added to the first mixture, second mixture, and/or the combination of the first and second mixtures. Moreover, an aqueous polymeric material described herein can be provided in any amount not inconsistent with the objectives oldie present invention. In some embodiments, for instance, an aqueous polymeric material is provided in an amount less than about 1 weight percent or less than about 0.1 weight percent of the combination of the first and second mixtures. In some embodiments, an aqueous polymeric material is provided in an amount between about 0.1 weight percent and about 1 weight percent or between about 0.001 and about 0.1 weight percent.

Further, any aqueous polymeric material not inconsistent with the objectives of the present invention may be used. In some embodiments, an aqueous polymeric material comprises an organic polymer or biopolymer dispersed in water. In some embodiments, the polymer is at least partially water soluble. In other embodiments, the polymer is suspended in water. Any organic polymer or biopolymer not inconsistent with the objectives of the present invention may be used. For instance, in some embodiments, a polymer comprises cellulose or a cellulosic material or cellulose derivative, including a cellulose, cellulosic material, or cellulose derivative described hereinabove regarding a hydrophobic sorption material. In some embodiments, a polymer comprises a chitosan, including a chitosan described hereinabove regarding a hydrophobic sorption material. In addition, in some embodiments, an aqueous polymeric material described herein comprises less than about 10 weight percent polymer. In some embodiments, an aqueous polymeric material comprises less than about 5 weight percent polymer. In some embodiments, an aqueous polymeric material comprises between about 1 weight percent and about 10 weight percent or between about 1 weight percent and about 5 weight percent polymer. The balance of the aqueous polymeric material, in some embodiments, comprises water or consists essentially of water.

Methods described herein, in some embodiments, further comprise providing one or more additives. Providing one or more additives can be carried out in any manner not inconsistent with the objectives of the present invention. In some embodiments, one or more additives are added to the first mixture prior to combining the first mixture with the second mixture. In some embodiments, one or more additives are added to the second mixture prior to combining the first mixture with the second mixture. In some embodiments, one or more additives are added to the combination of the first and second mixtures. Moreover, an additive described, herein can be provided in any amount not inconsistent with the objectives of the present invention. In some embodiments, for instance, an additive is provided in an amount less than about 10 weight percent, less than about 5 weight percent, less than about 3 weight percent, less than about 2 weight percent or less than about 1 weight percent of the mixture or combination of mixtures to which the additive is added. In some embodiments, an additive is provided in an amount between about 1 weight percent and about 10 weight percent or between about 1 weight percent and about 5 weight percent.

Further, any additive not inconsistent with the objectives of the present invention may be used. In some embodiments, for example, an additive comprises an ionic liquid. Any ionic liquid not inconsistent with the objectives of the present invention may be used. In some embodiments, an ionic liquid is imidazolium-based. In other embodiments, an ionic liquid is pyridinium-based. In some embodiments, an ionic liquid is choline-based. Further, in some embodiments, an ionic liquid comprises a sugar, sugar alcohol, or sugar derivative, such as glycol-choline, glycerol-choline, erythritol-choline, threitol-choline, arabitol-choline, xylitol-choline, ribitol-choline, mannitol-choline, sorbitol-choline, dulcitol-choline, iditol-choline, isomalt-choline, maltitol-choline, or lactitol-choline. Non-limiting examples of ionic liquids suitable for use in some embodiments described herein include 1-Allyl-3-methylimidazolium bis(trifluoromethylsulfonyl)imide, 1-Allyl-3-methylimidazolium bromide, 1-Allyl-3-methylimidazolium dicyanamide, 1-Allyl-3-methylimidazolium iodide, 1-Benzyl-3-methylimidazolium chloride, 1-Benzyl-3-methylimidazolium hexafluorophosphate, 1-Benzyl-3-methylimidazolium tetrafluoroborate, 1,3-Bis(3-cyanopropyl)imidazolium bis(trifluoromethylsulfonyl)imide, 1,3-Bis(3-cyanopropyl)imidazolium chloride, 1-Butyl-2,3-dimethylimidazolium hexafluorophosphate, 1-Butyl-2,3-dimethylimidazolium tetrafluoroborate, 4-(3-Butyl-1-imidazolio)-1-butanesulfonate, 1-Butyl-3-methylimidazolium acetate, 1-Butyl-3-methylimidazolium chloride, 1-Butyl-3-methylimidazolium dibutyl phosphate, 1-Butyl-3-methylimidazolium hexafluorophosphate, 1-Butyl-3-methylimidazolium nitrate, 1-Butyl-3-methylimidazolium octyl sulfate, 1-Butyl-3-methylimidazolium tetrachloroaluminate, 1-Butyl-3-methylimidazolium tetrafluoroborate, 1-Butyl-3-methylimidazolium thiocyanate, 1-Butyl-3-methylimidazolium tosylate, 1-Butyl-3-methylimidazolium trifluoroacetate, 1-Butyl-3-methylimidazolium trifluoromethanesulfonate, 1-(3-Cyanopropyl)-3-methylimidazolium bis(trifluoromethylsulfonyl)amide, 1-Decyl-3-methylimidazolium tetrafluoroborate, 1,3-Diethoxyimidazolium bis(trifluoromethylsulfonyl)imide, 1,3-Diethoxyimidazolium hexafluorophosphate, 1,3-Dihydroxyimidazolium bis(trifluoromethylsulfonyl)imide, 1,3-Dihydroxy-2-methylimidazolium bis(trifluoromethylsulfonyl)imide, 1,3-Dimethoxy-2-methylimidazolium hexafluorophosphate, 1-Dodecyl-3-methylimidazolium iodide, 1-Ethyl-2,3-dimethylimidazolium tetrafluoroborate, 1-Ethyl-3-methylimidazolium hexafluorophosphate, 1-Ethyl-3-methylimidazolium L-(+)-lactate, 1-Ethyl-3-methylimidazolium 1,1,2,2-tetrafluoroethanesulfonate, 1-Hexyl-3-methylimidazolium bis(trifluoromethylsulfonyl)imide, 1-Hexyl-3-methylimidazolium chloride, 1-Hexyl-3-methylimidazolium hexafluorophosphate, 1-Methylimidazolium chloride, 1-Methyl-3-octylimidazolium chloride, 1-Methyl-3-octylimidazolium tetrafluoroborate, 1-Methyl-3-propylimidazolium iodide, 1-Methyl-3-(3,3,4,4,5,5,6,6,7,7,8,8,8-tridecafluorooctyl)imidazolium hexafluorophosphate, 1,2,3-Trimethylimidazolium methyl sulfate, 1-Butyl-4-methylpyridinium chloride, 1-Butyl-4-methylpyridinium hexafluorophosphate, 1-Butylpyridinium bromide, 1-(3-Cyanopropyl)pyridinium chloride, 1-Ethylpyridinium tetrafluoroborate, 3-Methyl-1-propylpyridinium bis(trifluoromethylsulfonyl)imide, and Cholin acetate, all available commercially from Sigma-Aldrich.

In some embodiments, an additive comprises a thermal conductivity modulator. Any thermal conductivity modulator not inconsistent with the objectives of the present invention may be used. In some embodiments, for instance, a thermal conductivity modulator comprises carbon, including graphitic carbon. In some embodiments, a thermal conductivity modulator comprises carbon black and/or carbon nanoparticles. Carbon nanoparticles, in some embodiments, comprise carbon nanotubes and/or fullerenes. In some embodiments, a thermal conductivity modulator comprises a graphitic matrix structure. In other embodiments, a thermal conductivity modulator comprises an ionic liquid. In some embodiments, a thermal conductivity modulator comprises a metal, including pure metals and alloys. Any metal not inconsistent with the objectives of the present invention may be used. In some embodiments, a metal comprises a transition metal, such as silver or copper. In some embodiments, a metal comprises an element from Group 13 or Group 14 of the periodic table. In some embodiments, a metal comprises aluminum. In some embodiments, a thermal conductivity modulator comprises a metallic filler, a metal matrix structure, a metal tube, a metal plate, and/or metal shavings. Further, in some embodiments, a thermal conductivity modulator comprises a metal oxide. Any metal oxide not inconsistent with the objectives of the present invention may be used. In some embodiments, a metal oxide comprises a transition metal oxide. In some embodiments, a metal oxide comprises alumina.

In some embodiments, an additive comprises an antimicrobial material. Any antimicrobial material not inconsistent with the objectives of the present invention may be used. An antimicrobial material, in some embodiments, comprises an inorganic composition, including metals and/or metal salts. In some embodiments, for example, an antimicrobial material comprises metallic copper, zinc, or silver or a salt of copper, zinc, or silver. Moreover, in some embodiments, an antimicrobial material comprising a metal can also provide thermal conductivity modulation. In other embodiments, an antimicrobial material comprises an organic composition, including natural and synthetic organic compositions. In some embodiments, an antimicrobial material comprises a β-lactam such as a penicillin or cephalosporin. In some embodiments, an antimicrobial material comprises a protein synthesis inhibitor such as neomycin. In some embodiments, an antimicrobial material comprises an organic acid, such as lactic acid, acetic acid, or citric acid. In some embodiments, an antimicrobial material comprises a quarternary ammonium species. A quarternary ammonium species, in some embodiments, comprises a long alkyl chain, such as an alkyl chain having a C8 to C28 backbone. In some embodiments, an antimicrobial material comprises one or more of benzalkonium chloride, benzethonium chloride, methylbenzethonium chloride, cetalkonium chloride, cetylpyridinium chloride, cetrinonium, cetrimide, dofanium chloride, tetraethylammonium bromide, didecyldimethylammonium chloride, and domiphen bromide.

In some embodiments, an additive comprises a fire retardant. Any fire retardant not inconsistent with the objectives of the present invention may be used. In some embodiments, a fire retardant comprises a foam or gel. Further, in some embodiments, a fire retardant can comprise an organic composition or an inorganic composition. In some embodiments, a fire retardant comprises tris(2-chloro-1-(chloromethyl)ethyl)phosphate. In some embodiments, a fire retardant comprises aluminum hydroxide and/or magnesium hydroxide. In some embodiments, a fire retardant comprises a zeolite, including a natural or synthetic zeolite described herein.

Moreover, a method described herein, in some embodiments, comprises providing a plurality of additives. Any combination of additives described herein not inconsistent with the objectives of the present invention may be used. For instance, in some embodiments, a method comprises providing one or more thermal conductivity modulators, one or more antimicrobial materials, and/or one or more fire retardants.

Some methods described herein are carried out using a plurality of reaction vessels and/or using a plurality of mixtures. However, in some embodiments, a method of making a foam described herein can also be carried out in a single reaction vessel and/or using a single mixture. In some embodiments, for instance, a method of making a foam described herein comprises combining a PCM with a hydrophobic sorption material to provide a mixture, adding a polyfunctional monomer to the mixture, and adding a linker component to the mixture. In some embodiments, a method further comprises adding a second linker component to the mixture. In some embodiments, the second linker component is added to the mixture prior to adding the polyfunctional monomer and linker component to the mixture. In some embodiments, adding a second linker component to the mixture comprises forming a chemical bond between the second linker component and the PCM of the mixture as described hereinabove. In addition, in some embodiments, the polyfunctional monomer and linker component are added to the mixture after a gel or pre-polymer has been formed or partially formed in the mixture as described hereinabove. Moreover, in some embodiments, a polyfunctional monomer and linker component are added to a mixture at a slow rate, such as a sufficiently slow rate to avoid disruption of a gelling or pre-polymerization process described hereinabove. Further, in some embodiments, addition of a polyfunctional monomer to a mixture is carried out at a temperature greater than a transition temperature of a PCM or latent heat storage material of the mixture. In addition, in some embodiments, a mixture of a method described herein is free or substantially free of water. Moreover, as described hereinabove for methods comprising a plurality of mixtures, in some embodiments, one or more catalysts, blowing agents, aqueous polymeric materials, and/or additives can also be added to a single mixture described herein, including in any manner described herein not inconsistent with the objectives of the present invention. Further, as described hereinabove for methods comprising a plurality of mixtures, various components of a single mixture can be present in any amount not inconsistent with the objectives of the present invention, and components can be mixed in any manner not inconsistent with the objectives of the present invention, including at any temperature not inconsistent the objectives of the present invention.

A foam made by a method described herein, in some embodiments, can have one or more desirable thermal properties. In some embodiments, for instance, a foam made by a method described herein has a latent heat of at least about 50 J/g. In some embodiments, a foam has a latent heat of at least about 75 J/g. In some embodiments, a foam has a latent heat of at least about 90 J/g. In some embodiments, a foam has a latent heat of at least about 100 J/g. In some embodiments, a foam has a latent heat of at least about 110 J/g, at least about 115 J/g, or at least about 125 J/g. In some embodiments, a foam has a latent heat between about 50 J/g and about 150 J/g. In some embodiments, a foam has a latent heat between about 75 J/g and about 125 J/g, between about 75 J/g and about 110 J/g, between about 75 J/g and about 100 J/g, between about 90 J/g and about 125 J/g, or between about 90 J/g and about 110 J/g. Further, latent heat of a foam described herein is associated with a transition between two condensed phases or states of a PCM or latent heat storage material of the foam, such as a transition between a solid phase and a liquid phase, between a solid phase and a mesophase, between a solid state and a gel state, or between two solid states. A mesophase, in some embodiments, comprises a phase intermediate between a solid phase and a liquid phase. In addition, it is contemplated herein that, in some embodiments, a PCM or latent heat storage material may have more than one latent heat associated with a transition between two condensed phases or states, such as a first latent heat associated with a crystalline solid-amorphous solid transition and a second latent heat associated with a solid-liquid transition. In some embodiments comprising a PCM or latent heat storage material having more than one latent heat associated with a transition between two condensed phases, one of the latent heats has a value described hereinabove. In other embodiments, a plurality or all of the latent beats have a value described hereinabove.

Further, in some embodiments, a foam described herein exhibits other desirable properties for latent heat storage applications. For example, in some embodiments, a foam is non-flammable or substantially non-flammable. For reference purposes herein, a non-flammable or substantially non-flammable foam has a rating of A1, A2, or B1 when measured according to DIN 4102. Moreover, in some embodiments, a foam does not "sweat" or release a PCM or latent beat storage material at a temperature above a transition temperature of the PCM or latent heat storage material described herein, permitting the use of the foam in various applications requiring little or no "sweating" or flow. In some embodiments, a foam described herein does not "sweat" due to the viscosity of a gel formed as described herein. In some embodiments, a foam described herein does not "sweat" due to cross-linking between one or more components of the first and second mixtures described herein. Therefore, in some embodiments, foams described herein can be used in various construction and engineering applications without the need for microencapsulation of the PCM or latent heat storage material.

In addition, in some embodiments, a foam made by a method described herein has a density, flexibility, and/or mechanical strength similar to that of an otherwise similar foam not comprising a PCM or latent heat storage material dispersed in the foam. For example, in some embodiments, a foam made by a method described herein has a density between about 2 pounds per cubic foot (PCF) and about 8 PCF. Moreover, in some embodiments, a foam made by a method described herein comprises an open-cell foam. Alternatively, in other embodiments, a foam made by a method described herein comprises a closed-cell foam. In some embodiments, a foam made by a method described herein comprises a polyurethane foam. In some embodiments, a foam made by a method described herein comprises a polyester foam. In some embodiments, a foam made by a method described herein comprises a polystyrene foam.

IV. Compositions Comprising a Foam

In another aspect, compositions comprising a foam are described herein. In some embodiments, a composition comprises a foam and a latent heat storage material dispersed in foam, the latent heat storage material comprising a phase change material and a hydrophobic sorption material. In some embodiments, the latent heat storage material is uniformly or substantially uniformly dispersed in the foam. For reference purposes herein, the dispersion of a latent heat storage material can be determined based on the weight of the latent heat storage material in each 10 cm$^3$ volume of foam. A uniform or substantially uniform dispersion exhibits a mono-modal normal distribution of latent heat storage material within a random sampling of volume segments of the foam. In other embodiments, the latent heat storage material is non-uniformly dispersed in the foam. Moreover, in some embodiments, the latent heat storage material is chemically bonded to the foam, including through one or more covalent bonds. One or more covalent bonds, in some embodiments, comprises one or more cross-linking bonds between a component of the latent heat storage material and a component of the foam, such as a urethane bond.

Further, in some embodiments, a PCM of a composition described herein comprises an absorbate. For example, in some embodiments, a PCM is at least partially absorbed by a hydrophobic sorption material of the latent heat storage material. Moreover, in some embodiments, a hydrophobic sorption material comprises an absorbent. In other embodiments, a PCM is at least partially adsorbed by a hydrophobic sorption material. In some embodiments, for instance, a PCM comprises an adsorbate of the hydrophobic sorption material. In addition, in some embodiments, a hydrophobic sorption material adsorbs or absorbs a hydrophobic portion of a PCM, such as an aliphatic hydrocarbon portion of a PCM.

Moreover, in some embodiments, the hydrophobic sorption material is saturated by the PCM. A hydrophobic sorption material saturated by a PCM, in some embodiments, is unable or substantially unable to absorb or adsorb additional chemical species, such as additional hydrophobic chemical species.

In addition, in some embodiments, a hydrophobic sorption material described herein partially encapsulates a PCM. In some embodiments, the hydrophobic sorption material does not comprise a microcapsule, such as a microcapsule encapsulating the PCM. In some embodiments, a composition described herein comprises a self-encapsulating latent heat storage material. In some embodiments, a PCM or latent heat storage material described herein is not encapsulated by a microcapsule, such as a polymer microcapsule.

Further, in some embodiments, a latent heat storage material of a composition described herein comprises a gel. The gel comprises the PCM and the hydrophobic sorption material. Moreover, a gel, in some embodiments, comprises a continuous phase formed from the PCM. In other embodiments, a gel comprises a discontinuous phase formed from the PCM. A phase comprising a PCM, in some embodiments, can be a liquid phase or a solid phase. In addition, in some embodiments, a gel comprises a solid phase formal from a hydrophobic sorption material of the composition. The solid phase, in some embodiments, is a continuous phase. Further, in some embodiments, a gel does not comprise water or is substantially free of water.

Further, in some embodiments, a gel described herein has a viscosity between about 200 cP and about 20,000 cP, between about 200 cP and about 10,000 cP, between about 1000 cP and about 15,000 cP, or between about 1000 cP and about 5000 cP measured according to ASTM standard D2983. In some embodiments, a gel has a viscosity between about 200 cP and about 50,000 cP at a temperature between about 20° C. and about 70° C. at 1 atm. In some embodiments, a gel has a viscosity between about 200 cP and about 25,000 cP, between about 200 cP and about 10,000 cP, or between about 1000 cP and about 5000 cP at a temperature between about 20° C. and about 70° C. at 1 atm. Moreover, in some embodiments, a gel has a viscosity between about 5000 cP and about 20,000 cP at a temperature between about −40° C. and about 40° C. at 1 atm or between about −30° C. and about 30° C. at 1 atm. In some embodiments, a gel has a viscosity between about 5000 cP and about 20,000 cP at a temperature between about −50° C. and about 0° C. at 1 atm or between about −20° C. and about 0° C. at 1 atm. In other embodiments, a gel has a viscosity between about 5000 cP and about 20,000 cP at a temperature between about 30° C. and about 50° C. at 1 atm or between about 35° C. and about 45° C. at 1 atm. In some embodiments, a gel does not readily flow without the application of an external force or pressure. In some embodiments, a gel is self-supporting or non-encapsulated.

Further, in some embodiments, a PCM of a latent heat storage material described herein is chemically bonded to a linker component of the latent heat storage material. A PCM can be chemically bonded to a linker component in any manner not inconsistent with the objectives of the present invention, including in a manner described hereinabove in Section III. In addition, a linker component can comprise any linker component described hereinabove Section III, including a second linker component.

In addition, in some embodiments, a composition described herein further comprises an additive dispersed in the latent heat storage material. Further, in some embodiments, the latent heat storage material is free or substantially free of water.

Moreover, a composition described herein, in some embodiments, exhibits desirable latent beat storage properties. In some embodiments, for instance, a composition described herein has a condensed phase latent heat of at least about 50 J/g. In some embodiments, a composition has a condensed phase latent heat of at least about 75 J/g. In some embodiments, a composition has a condensed phase latent heat of at least about 90 J/g. In some embodiments, a composition has a condensed phase latent heat of at least about 100 J/g. In some embodiments, a composition has a condensed phase latent heat of at least about 110 J/g, at least about 115 J/g, or at least about 125 J/g. In some embodiments, a composition has a condensed phase latent heat between about 50 J/g and about 150 J/g. In some embodiments, a composition has a condensed phase latent heat between about 50 J/g and about 125 J/g, between about 75 J/g and about 125 J/g, between about 75 J/g and about 110 J/g, between about 75 J/g and about 100 J/g, between about 90 J/g and about 125 J/g, or between about 90 J/g and about 110 J/g.

Further, in some embodiments, a composition described herein exhibits other desirable properties for latent heat storage applications. For example, in some embodiments, a composition is non-flammable or substantially non-flammable. Moreover, in some embodiments, a composition described herein does not "sweat" or release the latent heat storage material at a temperature above a transition temperature of the latent heat storage material described herein, permitting the use of the composition in various applications requiring little or no "sweating" or flow. In some embodiments, a composition described herein does not "sweat" due to one or more chemical bonds between the foam and the latent heat storage material of the composition as described herein. In some embodiments, as composition described herein does not "sweat" due to the viscosity of the latent heat storage material. Therefore, in some embodiments, compositions described herein can be used in various construction and engineering applications without the need for microencapsulation of the latent heat storage material.

Turning now to specific embodiments of compositions, compositions described herein comprise a foam. Any foam not inconsistent with the objectives of the present invention may be used. In some embodiments, a foam comprises any foam described hereinabove in Section III, including a polyurethane foam or polyester foam. Moreover, a foam can have any property of a foam described hereinabove in Section III. For example, in some embodiments, a foam has a density, flexibility, and/or mechanical strength similar to that of an otherwise similar foam not comprising a latent heat storage material dispersed in the foam. In some embodiments, a foam has a density between about 2 PCF and about 8 PCF. Moreover, in some embodiments, a foam comprises an open-cell foam. Alternatively, in other embodiments, a foam comprises a closed-cell foam.

Compositions described herein also comprise a latent heat storage material dispersed in the foam. Any latent heat storage material not inconsistent with the objectives of the present invention may be used. In some embodiments, a latent heat storage material comprises any latent heat storage material described hereinabove in Section III. Further, a latent heat storage material of a composition described herein comprises a PCM. Any PCM not inconsistent with the objectives of the present invention may be used. In some embodiments, PCM comprises a PCM described hereinabove in Section III.

Further, in some embodiments of compositions described herein, a latent heat storage material comprises a PCM chemically bonded to a linker component. The linker component can comprise any linker component described hereinabove in Section III, including a second linker component.

Moreover, compositions described herein, in some embodiments, comprise one or more additives dispersed in the latent heat storage material. Any additive not inconsistent with the objectives of the present invention may be used. In some embodiments, an additive comprises an additive described hereinabove in Section III.

Some embodiments described herein are further illustrated in the following non-limiting examples.

EXAMPLE 1

Composition Comprising a PCM

A composition comprising a PCM described herein was prepared as follows. First, 8 kg myristic acid (Univar) and 1.6 kg myristic alcohol (Univar) were added to a 10 gallon tank equipped with a mixer and heated at 70° C. Next, after 30 minutes of mixing, 0.3 kg hydroxypropyl cellulose (Ashland) and 0.1 kg of xylitol-choline chloride ionic liquid (QuarTek) were added gradually. Mixing was continued for another 10 minutes.

EXAMPLE 2

Composition Comprising a PCM

A composition comprising a PCM described herein was prepared as follows. First, 9.6 kg lauric acid (Univar) was added to a 10 gallon tank equipped with a mixer and heated at 50° C. Next, after 30 minutes of mixing, 0.3 kg fumed silica aerogel (Cab-O-Sil, Cabot) and 0.1 kg xylitol-choline chloride ionic liquid (QuarTek) were added gradually. Mixing was continued for another 10 minutes.

EXAMPLE 3

Composition Comprising a PCM

A composition comprising a PCM described herein was prepared as follows. First, 8 myristic acid (Univar) and 1.6 kg myristic alcohol (Univar) were added to a 10 gallon tank equipped with a mixer and heated at 70° C. Next, after 30 minutes of mixing, 0.3 kg fumed silica aerogel (Cab-O-Sil, Cabot) and 0.1 kg xylitol-choline chloride ionic liquid (QuarTek) were added gradually. Mixing was continued for another 10 minutes.

EXAMPLE 4

Composition Comprising a PCM

A composition comprising a PCM described herein was prepared as follows. First, 9.6 lauric acid (Univar) was added to a 10 gallon tank equipped with a mixer and heated at 50° C. Next, after 30 minutes of mixing, 0.3 kg fumed aerogel (Cab-O-Sil, Cabot) and 0.1 kg methylene diphenyl diisocyanate (BASF) were added gradually. Mixing was continued for another 10 minutes.

EXAMPLE 5

Composition Comprising a PCM

A composition comprising a PCM described herein was prepared as follows. First, 9.6 kg lauryl alcohol (Univar) was added to a 10 gallon tank equipped with a mixer and heated at 30° C. Next, after 30 minutes of mixing, 0.3 kg fumed silica aerogel (Cab-O-Sil, Cabot) and 0.1 kg methylene diphenyl diisocyanate (BASF) were added gradually. Mixing was continued for another 10 minutes.

EXAMPLE 6

Composition Comprising a PCM

A composition comprising as PCM described herein was prepared as follows. First, 9.6 kg lauryl alcohol (Univar) was added to a 10 gallon tank equipped with a mixer and heated at 30° C. Next, after 30 minutes of mixing, 0.3 kg fumed silica aerogel (Cab-O-Sil, Cabot) and 0.1 kg xylitol-choline chloride ionic liquid (QuarTek) were added gradually. Mixing was continued for another 10 minutes.

EXAMPLE 7

Composition Comprising a PCM

A composition comprising a PCM described herein was prepared as follows. First, 8 kg myristic acid (Univar) and 1.6 kg myristic alcohol (Univar) were added to a 10 gallon tank equipped with a mixer and heated at 70° C. Next, after 30 minutes of mixing, 0.3 kg fumed silica aerogel (Cab-O-Sil, Cabot) and 0.1 kg methylene diphenyl diisocyanate (BASF) were added gradually. Mixing was continued for another 10 minutes.

EXAMPLE 8

Composition Comprising a PCM

A composition comprising a PCM described herein was prepared as follows. First, 8 kg, myristic acid (Univar) and 1.6 kg myristic alcohol (Univar) were added to a 10 gallon tank equipped with a mixer and heated at 70° C. Next, after 30 minutes of mixing, 0.3 kg fumed silica aerogel (Cab-O-Sil, Cabot), 0.09 kg methylene diphenyl diisocyanate (BASF), and 0.01 kg dibutyltin catalyst (D.B. Becker) were added gradually. Mixing was continued for another 10 minutes.

EXAMPLE 9

Composition Comprising a PCM

A composition comprising a PCM described herein was prepared as follows. First, 8.3 kg lauric acid (Univar) was added to a 10 gallon tank equipped with a mixer and heated at 70° C. Next, after 15 minutes of mixing, 1.5 kg SBC (G1651HU, Kraton Polymers) and 0.2 kg xylitol-choline chloride ionic liquid (QuarTek) were added gradually. Mixing was continued for another 15 minutes at 90° C.

EXAMPLE 10

Composition Comprising a PCM

A composition comprising a PCM described herein was prepared as follows. First, 8.3 kg lauric acid (Univar) was added to a 10 gallon tank equipped with a mixer and heated at 70° C. Next, after 15 minutes of mixing, 1.5 kg SBC (G1651HU, Kraton Polymers) and 0.2 kg methylene diphenyl diisocyanate (BASF) were added gradually. Mixing was continued for another 10 minutes.

EXAMPLE 11

Method of Making a Foam

A composition comprising a foam described herein was prepared as follows. First, 250 g of the composition of Example 1 and 240 g castor oil (DIC Laboratories Inc.) were added to a 1 gallon tank equipped with a mixer. Next, after 2 minutes of mixing, 120 g methylene diphenyl diisocyanate (BASF), 2 g dibutyltin laurate, and 30 g water were added sequentially to the tank. Mixing was carried out for one minute in between each addition. In addition, mixing was continued for another minute after the last addition. Then, the entire mixture was poured into a container having a length, width, and height corresponding to the desired dimensions of the foam composition.

EXAMPLE 12

Method of Making a Foam

A composition comprising a foam described herein was prepared as follows. First, 250 g of the composition of Example 2 and 240 g castor oil (DIC Laboratories Inc.) were added to a 1 gallon tank equipped with a mixer. Next, after 2 minutes of mixing, 120 g methylene diphenyl diisocyanate (BASF), 2 g dibutyltin laurate, and 30 g water were added sequentially to the tank. Mixing was carried out for one minute in between each addition. In addition, mixing was continued for another minute after the last addition. Then, the entire mixture was poured into a container having a length, width, and height corresponding to the desired dimensions of the foam composition.

EXAMPLE 13

Method of Making a Foam

A composition comprising a foam described herein was prepared as follows. First, 250 g of the composition of Example 3 and 240 g castor oil (DIC Laboratories Inc.) were added to a 1 gallon tank equipped with a mixer. Next, after 2 minutes of mixing, 120 g methylene diphenyl diisocyanate (BASF), 2 g dibutyltin laurate, and 30 g water were added sequentially to the tank. Mixing was carried out for one minute in between each addition. In addition, mixing was continued for another minute after the last addition. Then, the entire mixture was poured into a container having a length, width, and height corresponding, to the desired dimensions of the foam composition.

EXAMPLE 14

Method of Making a Foam

A composition comprising a foam described herein was prepared as follows. First, 240 g castor oil (DIC Laboratories Inc.) was placed in a 1 gallon tank equipped with a mixer. Next, 120 g methylene diphenyl diisocyanate (BASF) was added to the tank, following by mixing for 1 minute and then the addition of 2 g dibutyltin laurate. Then 250 g of the composition of Example 1 was added while mixing, followed by the addition of 30 g water. Mixing was continued for another minute after the last addition. The entire mixture was then poured into a container having a length, width, and height corresponding to the desired dimensions of the foam composition.

EXAMPLE 15

Method of Making a Foam

A composition comprising a foam described herein was prepared as follows. First, 240 g castor oil (DIC Laboratories Inc.) was placed in a 1 gallon tank equipped with a mixer. Next, 120 g methylene diphenyl diisocyanate (BASF) was added to the tank, following by mixing for 1 minute and then the addition of 2 g dibutyltin laurate. Then 250 g of the composition of Example 2 was added while mixing, followed by the addition of 30 g water. Mixing was continued for another minute after the last addition. The entire mixture was then poured into a container having a length, width, and height corresponding to the desired dimensions of the foam composition.

EXAMPLE 16

Method of Making a Foam

A composition comprising a foam described herein was prepared as follows. First, 240 g castor oil (DIC Laboratories Inc.) was placed in a 1 gallon tank equipped with a mixer. Next, 120 g methylene diphenyl diisocyanate (BASF) was added to the tank, following by mixing for 1 minute and then the addition of 2 g dibutyltin laurate. Then 250 g of the composition of Example 3 was added while mixing, followed by the addition of 30 g water. Mixing was continued for another minute, after the last addition. The entire mixture was then poured into a container having a length, width, and height corresponding to the desired dimensions of the foam composition.

Various embodiments of the invention have been described in fulfillment of the various objectives of the invention. It should be recognized that these embodiments are merely illustrative of the principles of the present invention. Numerous modifications and adaptations thereof will be readily apparent to those skilled in the art without departing from the spirit and scope of the invention.

That which is claimed is:

1. A method of making a foam comprising:
combining a phase change material, a polyfunctional monomer, and a linker component; and
cross-linking the linker component to at least one of the phase change material and the polyfunctional monomer,
wherein the polyfunctional monomer comprises a polyol;
wherein the linker component comprises an isocyanate; and
wherein the phase change material comprises one or more fatty acids, one or more alkyl esters of a fatty acid, one or more fatty alcohols, one or more fatty sulfonates or phosphonates, or a combination thereof.

2. The method of claim 1, wherein the polyol comprises a diol or triol.

3. The method of claim 1, wherein the polyol further comprises a polyether polyol or a polyester polyol.

4. The method of claim 1, wherein the isocyanate comprises a polyfunctional isocyanate.

5. The method of claim 1, wherein the isocyanate comprises a diisocyanate.

6. The method of claim 5, wherein the diisocyanate comprises methylene diphenyl diisocyanate (MDI), toluene diisocyanate (TDI), naphthalene diisocyanate (NDI), isophorone diisocyanate (IPDI), and/or hexamethylene diisocyanate (HDI).

7. The method of claim 1, wherein the phase change material has a phase transition temperature between 0° C. and 70° C.

8. The method of claim 1, wherein the phase change material has a phase transition temperature between 30° C. and 50° C.

9. The method of claim 1, further comprising adding a catalyst to the combination of the phase change material, the polyfunctional monomer, and the linker component.

10. The method of claim 9, wherein the catalyst comprises a metal complex comprising mercury, lead, tin, bismuth or zinc.

11. The method of claim 1, further comprising adding an additive to the combination of the phase change material, the polyfunctional monomer, and the linker component.

12. The method of claim 11, wherein the additive comprises an ionic liquid.

13. The method of claim 11, wherein the additive comprises an antimicrobial material or a fire retardant.

14. The method of claim 1, further comprising adding a blowing agent to the combination of the phase change material, the polyfunctional monomer, and the linker component.

15. The method of claim 13, wherein the foam has a latent heat in the range of 50 J/g to 150 J/g.

16. The method of claim 1, wherein the polyol comprises at least one of a diol and/or a triol.

17. The method of claim 1, wherein the polyol comprises at least one of a polyether polyol, a poly(tetramethylene ether) glycol, a polyester polyol, and/or a fluorinated polyol.

18. The method of claim 1, wherein the polyol comprises a graft polyol and/or a filled polyol.

19. The method of claim 18, wherein the graft polyol and/or filled polyol comprises at least one of a styrene-acrylonitrile, a acrylonitrile, and/or a polyuria polyol.

20. The method of claim 1, wherein the polyol comprises a plurality of differing polyols.

21. The method of claim 20, wherein the plurality of differing polyols is selected based on at least one of a determined density, a determined flexibility, and/or a determined mechanical strength of the foam.

22. The method of claim 20, wherein the polyol has a polydisperse molecular weight.

23. The method of claim 1, wherein the phase change material comprises at least one of a fatty acid and an alkyl ester of a fatty acid.

24. The method of claim 23, wherein the alkyl ester of a fatty acid comprises at least one of a methyl, ethyl, propyl, and/or butyl ester of a fatty acid.

25. The method of claim 23, wherein the alkyl ester of a fatty acid comprises a C2 to C28 ester alkyl backbone.

26. The method of claim 24, wherein the alkyl ester of the fatty acid comprises at least one of a laurate, a myristate, a palmitate, a stearate, a palmitoleate, a oleate, a linoleate, a docosahexanoate, or a ecosapentanoate.

27. The method of claim 1, further comprises adding a catalyst to at least one of the phase change material, the polyfunctional monomer, and/or the linker component prior to the combining.

* * * * *